(12) United States Patent
Chen et al.

(10) Patent No.: US 11,516,464 B2
(45) Date of Patent: Nov. 29, 2022

(54) METHOD FOR OBTAINING CANDIDATE MOTION VECTOR LIST, APPARATUS, ENCODER, AND DECODER

(71) Applicant: HUAWEI TECHNOLOGIES CO., LTD., Guangdong (CN)

(72) Inventors: Huanbang Chen, Shenzhen (CN); Haitao Yang, Shenzhen (CN); Lian Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 56 days.

(21) Appl. No.: 17/180,274

(22) Filed: Feb. 19, 2021

(65) Prior Publication Data

US 2021/0176462 A1   Jun. 10, 2021

Related U.S. Application Data

(63) Continuation of application No. PCT/CN2020/088635, filed on May 6, 2020.

(30) Foreign Application Priority Data

May 15, 2019   (CN) .......................... 201910408133.5

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/159* (2014.11); *H04N 19/176* (2014.11); *H04N 19/30* (2014.11)

(58) Field of Classification Search
CPC .................................................... H04N 19/00
See application file for complete search history.

(56) References Cited

U.S. PATENT DOCUMENTS 9,445,104 B2   9/2016 Lee et al.
2011/0080954 A1   4/2011 Bossen et al.
(Continued)

FOREIGN PATENT DOCUMENTS

CN   109076213 A   12/2018
CN   109196864 A   1/2019
(Continued)

OTHER PUBLICATIONS

Frank Bossen et al., Simplified motion vector coding method. Joint Collaborative Team on Video Coding (JCT-VC) of ITU-T SG16 WP3 and ISO/IEC JTC1/SC29/WG11, 2nd Meeting: Geneva, CH, Jul. 21-28, 2010, JCTVC-B094, 5 pages.
(Continued)

*Primary Examiner* — Maryam A Nasri
(74) *Attorney, Agent, or Firm* — Womble Bond Dickinson (US) LLP

(57) ABSTRACT

This disclosure discloses a method for obtaining a candidate motion vector list, an apparatus, an encoder, and a decoder. The method for obtaining a candidate motion vector list comprises: when a first candidate picture block is encoded/decoded and an inter prediction mode is used, determining whether a reference picture of the first candidate picture block is the same as a reference picture of a current block; and constructing a candidate motion vector list of the current block based on a determining result; when the reference picture of the first candidate picture block is different from the reference picture of the current block, the MV of the first candidate picture block is not used to construct the list. Implementing this disclosure can reduce complexity of a motion information derivation process, and improve coding efficiency.

20 Claims, 10 Drawing Sheets

(51) Int. Cl.
*H04N 19/159* (2014.01)
*H04N 19/176* (2014.01)
*H04N 19/30* (2014.01)

(56) References Cited

U.S. PATENT DOCUMENTS

| | | | | |
|---|---|---|---|---|
| 2015/0195558 A1* | 7/2015 | Kim | ........................ | H04N 19/56 375/240.16 |
| 2021/0037257 A1* | 2/2021 | Lee | ........................ | H04N 19/70 |
| 2021/0337232 A1* | 10/2021 | Zheng | .................. | H04N 19/139 |

FOREIGN PATENT DOCUMENTS

| | | |
|---|---|---|
| CN | 109218733 A | 1/2019 |
| JP | 2013507055 A | 2/2013 |
| JP | 2013131918 A | 7/2013 |
| WO | 2019068753 A1 | 4/2019 |

OTHER PUBLICATIONS

Joonyoung Park et al., CE9 Subtests N and O: Improvement on AMVP. Joint Collaborative Team on Video Coding (JCT-VC) of ITU-T SG16 WP3 and ISO/IEC JTC1/SC29/WG11, 5th Meeting: Geneva, Mar. 16-23, 2011, JCTVC-E350, WG11 No. m19878, 5 pages.

Jianle Chen et al.,"Algorithm description for Versatile Video Coding and Test Model 4 (VTM 4)",Joint Video Experts Team (JVET) of 1TU-T SG 16 WP 3 and1S0/IEC JTC 1/SC 29/WG 11 13th Meeting: Marrakech, MA, Jan. 9-18, 2019, JVET-M1002-v2,total:62pages.

K. McCann et al.,"High Efficiency Video Coding (HEVC) Test Model 16 (HM 16) Encoder Description",Joint Collaborative Team on Video Coding (JCT-VC) of ITU-T SG16 WP3 and ISO/IEC JTCI/SC29/WGII 18th Meeting: Sapporo, JP, Jun. 7, Jul. 30, 2014,JCTVC-81002,total:59pages.

Zhu Xiuchang et al., A New Standard for H.265(HEVC) Video Coding and Its Extension, Electronic Industry Press, Jul. 2016, 4 pages.

* cited by examiner

METHOD FOR OBTAINING CANDIDATE MOTION VECTOR LIST, APPARATUS, ENCODER, AND DECODER

CROSS-REFERENCE TO RELATED APPLICATIONS

This application is a continuation of International Application No. PCT/CN2020/088635, filed on May 6, 2020, which claims priority to Chinese Patent Application No. 201910408133.5, filed on May 15, 2019, the disclosures of the aforementioned patent applications are hereby incorporated by reference in their entireties.

TECHNICAL FIELD

This disclosure relates to the field of video coding technologies, and in particular, to a method for obtaining a candidate motion vector list, an apparatus, an encoder, and a decoder.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (also referred to as "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 part 10 advanced video coding (AVC), the video coding standard H.265/high efficiency video coding (HEVC) standard, and extensions of such standards. The video apparatuses can transmit, receive, encode, decode, and/or store digital video information more efficiently by implementing the video compression technologies.

An advanced motion vector prediction (AMVP) mode is an inter prediction mode in HEVC. In the AMVP mode, spatially or temporally neighboring coded blocks (denoted as neighboring blocks) of a current block are first traversed; then a candidate motion vector list (which may also be referred to as a motion information candidate list) is obtained based on motion information of each neighboring block, where a maximum length of the candidate motion vector list is 2; and then an optimal motion vector (MV) is determined from the candidate motion vector list based on a rate distortion cost (RD cost); and a candidate motion vector with a minimum RD cost is used as a motion vector predictor (MVP) of the current block.

However, in a process of obtaining a candidate motion vector list in a conventional technology, an MV of a neighboring block should be further processed before being added to the candidate motion vector list. This is comparatively complex.

SUMMARY

Embodiments of this disclosure provide a method for obtaining a candidate motion vector list, an apparatus, an encoder, and a decoder, to simplify a process of obtaining a candidate motion vector list in an inter prediction mode, reduce complexity of a motion information derivation process, and improve coding efficiency to some extent.

An embodiment of this disclosure provides a method for obtaining a candidate motion vector list. The method comprises: when a first candidate picture block is encoded or decoded, and an inter prediction mode for the first candidate picture block is used, determining whether a reference picture of the first candidate picture block is the same as a reference picture of a current block; and constructing a candidate motion vector list for the current block based on a result of the determining, where when the reference picture of the first candidate picture block is the same as the reference picture of the current block, the candidate motion vector list comprises a motion vector MV of the first candidate picture block; when the reference picture of the first candidate picture block is different from the reference picture of the current block, the candidate motion vector list does not comprise the MV of the first candidate picture block.

It should be understood that the first candidate picture block and a second candidate picture block in this embodiment of this disclosure are picture blocks that have a preset location relationship with the current block. If this method is implemented on an encoder side, the first candidate picture block or the second candidate picture block is an encoded block; or if this method is implemented on a decoder side, the first candidate picture block or the second candidate picture block is a decoded block. It may be assumed that the first candidate picture block is a left candidate picture block spatially neighboring to the current block, and the second candidate picture block is an above candidate picture block spatially neighboring to the current block. However, specific locations of the first candidate picture block and the second candidate picture block are not limited in this embodiment of this disclosure. For ease of description and understanding in this specification, for example, the left candidate picture block is used to represent the first candidate picture block, and the above candidate picture block is used to represent the second candidate picture block.

In this disclosure, when the reference picture of the spatially neighboring left candidate picture block is different from the reference picture of the current block, the MV of the left candidate picture block does not need to be scaled, and the MV of the left candidate picture block is directly excluded. This can simplify a process of obtaining the candidate motion vector list in the inter prediction mode, reduce complexity of a motion information derivation process, and improve coding efficiency.

In an embodiment, the method further comprises: when the second candidate picture block is encoded or decoded, and the inter prediction mode for the second candidate picture block is used, determining whether a reference picture of the second candidate picture block is the same as the reference picture of the current block; and when the reference picture of the second candidate picture block is the same as the reference picture of the current block, using an MV of the second candidate picture block as a candidate motion vector in the candidate motion vector list. When the reference picture of the second candidate picture block is different from the reference picture of the current block, the candidate motion vector list does not comprise the MV of the second candidate picture block.

In this disclosure, when the reference picture of the spatially neighboring above candidate picture block is different from the reference picture of the current block, the MV of the above candidate picture block does not need to be scaled, and the MV of the above candidate picture block is directly excluded. This can simplify a process of obtaining the candidate motion vector list in the inter prediction mode, reduce complexity of a motion information derivation process, and improve coding efficiency.

In an embodiment, when the reference picture of the second candidate picture block is different from the reference picture of the current block, the MV of the second candidate picture block is scaled based on a POC of the reference picture of the second candidate picture block, and based on a POC of the reference picture of the current block, and a scaled MV is used as a candidate motion vector in the candidate motion vector list.

In this disclosure, when the reference picture of the spatially neighboring above candidate picture block is different from the reference picture of the current block, whether the left candidate picture block of the current picture block is available does not need to be determined, and the MV of the above candidate picture block is directly scaled. This can improve accuracy of MV prediction and coding efficiency.

In an embodiment, the current block has a plurality of reference pictures, and the determining whether a reference picture of the first candidate picture block is the same as a reference picture of a current block comprises: separately comparing POCs of the plurality of reference pictures with the POC of the reference picture of the first candidate picture block; and when one of the POCs of the plurality of reference pictures is the same as the POC of the reference picture of the first candidate picture block, determining that the reference picture of the first candidate picture block is the same as the reference picture of the current block.

In a possible implementation, before the using an MV of the second candidate picture block as a candidate motion vector in the candidate motion vector list, the method further includes: determining that the MV of the first candidate picture block and the MV of the second candidate picture block are different. When the MV of the first candidate picture block is the same as the MV of the second candidate picture block, the candidate motion vector list does not comprise the MV of the second candidate picture block.

In this disclosure, a repeated motion vector in the candidate motion vector list is deleted. This can eliminate redundancy, and improve accuracy of MV prediction and coding efficiency.

An embodiment of this disclosure provides an inter prediction apparatus, including several functional units configured to implement any method in the first aspect. For example, the inter prediction apparatus may comprise: a determining module, configured to: when a first candidate picture block is encoded or decoded, and an inter prediction mode for the first candidate picture block is used, determine whether a reference picture of the first candidate picture block is the same as a reference picture of a current block; and a processing module, configured to construct a candidate motion vector list of the current block based on a determining result, where when the reference picture of the first candidate picture block is the same as the reference picture of the current block, the candidate motion vector list comprises an MV of the first candidate picture block, or when the reference picture of the first candidate picture block is different from the reference picture of the current block, the candidate motion vector list does not comprise the MV of the first candidate picture block.

In this disclosure, when a reference picture of a spatially neighboring left candidate picture block is different from the reference picture of the current block, an MV of the left candidate picture block does not need to be scaled, and the MV of the left candidate picture block is directly excluded. This can simplify a process of obtaining the candidate motion vector list in the inter prediction mode, reduce complexity of a motion information derivation process, and improve coding efficiency.

In an embodiment, the determining module is further configured to: when a second candidate picture block is encoded or decoded, and the inter prediction mode for the second candidate picture block is used, determine whether a reference picture of the second candidate picture block is the same as the reference picture of the current block; and the processing module is further configured to: when the reference picture of the second candidate picture block is the same as the reference picture of the current block, use an MV of the second candidate picture block as a candidate motion vector in the candidate motion vector list. When the reference picture of the second candidate picture block is different from the reference picture of the current block, the candidate motion vector list does not comprise the MV of the second candidate picture block.

In this disclosure, when a reference picture of a spatially neighboring above candidate picture block is different from the reference picture of the current block, an MV of the above candidate picture block does not need to be scaled, and the MV of the above candidate picture block is directly excluded. This can simplify a process of obtaining the candidate motion vector list in the inter prediction mode, reduce complexity of a motion information derivation process, and improve coding efficiency.

In an embodiment, the processing module is further configured to: when the reference picture of the second candidate picture block is different from the reference picture of the current block, scale the MV of the second candidate picture block based on a picture order count POC of the reference picture of the second candidate picture block and a POC of the reference picture of the current block, and use a scaled MV as a candidate motion vector in the candidate motion vector list.

In this disclosure, when a reference picture of a spatially neighboring above candidate picture block is different from the reference picture of the current block, whether the left candidate picture block of the current picture block is available does not need to be determined, and an MV of the above candidate picture block is directly scaled. This can improve accuracy of MV prediction and coding efficiency.

In an embodiment, the current block has a plurality of reference pictures, and the determining module is specifically configured to: separately compare POCs of the plurality of reference pictures with the POC of the reference picture of the first candidate picture block; and when one of the POCs of the plurality of reference pictures is the same as the POC of the reference picture of the first candidate picture block, determine that the reference picture of the first candidate picture block is the same as the reference picture of the current block.

In an embodiment, the processing module is further configured to determine that the MV of the first candidate picture block and the MV of the second candidate picture block are different. When the MV of the first candidate picture block is the same as the MV of the second candidate picture block, the candidate motion vector list does not comprise the MV of the second candidate picture block.

In this disclosure, a repeated motion vector in the candidate motion vector list is deleted. This can eliminate redundancy, and improve accuracy of MV prediction and coding efficiency.

An embodiment of this disclosure provides a video encoder. The video encoder is configured to encode a picture block, and comprises:

the inter prediction apparatus according to the second aspect and any implementation of the second aspect, where the inter prediction apparatus is configured to: predict motion information of a current encoding picture block based on target candidate motion information, and determine a prediction sample value of the current encoding picture block based on the motion information of the current encoding picture block;

an entropy encoding module, configured to encode an index indicator of the target candidate motion information into a bitstream, where the index indicator indicates the target candidate motion information used for the current encoding picture block; and a reconstruction module, configured to reconstruct the current encoding picture block based on the prediction sample value.

An embodiment of this disclosure provides a video decoder. The video decoder is configured to decode a picture block from a bitstream, and comprises:

an entropy decoding module, configured to decode the bitstream to obtain an index indicator, where the index indicator is used to indicate target candidate motion information of a current decoding picture block;

the inter prediction apparatus according to the second aspect and any implementation of the second aspect, where the inter prediction apparatus is configured to: predict motion information of the current decoding picture block based on the target candidate motion information indicated by the index indicator, and determine a prediction sample value of the current decoding picture block based on the motion information of the current decoding picture block; and a reconstruction module, configured to reconstruct the current decoding picture block based on the prediction sample value.

An embodiment of this disclosure provides a video data decoding device. The device comprises:

a memory, configured to store video data in a form of a bitstream; and a video decoder, configured to decode the bitstream to obtain the video data.

According to a sixth aspect, an embodiment of this disclosure provides a video data encoding device. The device comprises:

a memory, configured to store video data, where the video data comprises one or more picture blocks; and a video encoder, configured to generate a bitstream based on the video data.

An embodiment of this disclosure provides an encoding device, including a non-volatile memory and a processor that are coupled to each other. The processor invokes program code stored in the memory, to perform a part of or all steps of any method in the first aspect.

An embodiment of this disclosure provides a decoding device, including a non-volatile memory and a processor that are coupled to each other. The processor invokes program code stored in the memory, to perform a part of or all steps of any method in the first aspect.

An embodiment of this disclosure provides a computer-readable storage medium. The computer-readable storage medium stores program code, and the program code comprises an instruction used to perform a part of or all steps of any method in the first aspect.

An embodiment of this disclosure provides a computer program product. When the computer program product runs on a computer, the computer is enabled to perform a part of or all steps of any method in the first aspect.

It should be understood that, the technical solutions in the second aspect to the tenth aspect of this disclosure are consistent with that in the first aspect of this disclosure. Beneficial effects achieved by the various aspects and corresponding feasible implementations are similar, and details are not described again.

It can be learned that, in the embodiments of this disclosure, when a reference picture of a spatially neighboring candidate picture block is different from the reference picture of the current block, an MV of the candidate picture block does not need to be scaled, and the MV of the candidate picture block is directly excluded. This can simplify the process of obtaining the candidate motion vector list in the inter prediction mode, reduce complexity of the motion information derivation process, and improve the coding efficiency.

BRIEF DESCRIPTION OF DRAWINGS

To describe technical solutions in embodiments of this disclosure clearer, the following briefly describes the accompanying drawings for describing the embodiments of this disclosure.

DESCRIPTION OF EMBODIMENTS

Figure 1A:
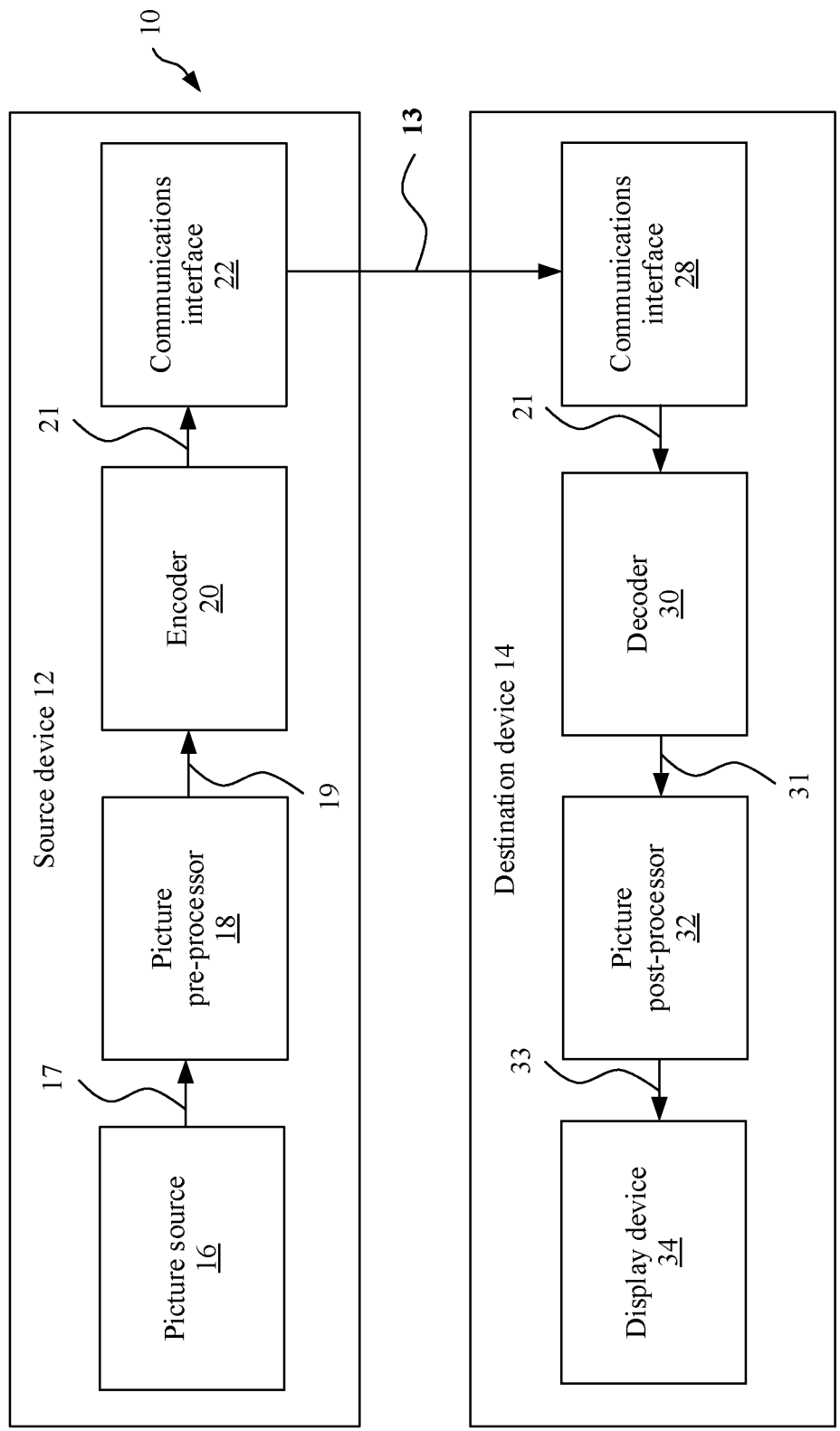
FIG. 1A is a block diagram of an example of a video coding system 10 for implementing an embodiment of this disclosure.

The following describes the embodiments of this disclosure with reference to the accompanying drawings in the embodiments of this disclosure. In the following descriptions, reference is made to the accompanying drawings that constitute a part of this disclosure and show, by way of illustration, specific aspects of the embodiments of this disclosure or specific aspects in which the embodiments of this disclosure may be used. It should be understood that the embodiments of this disclosure may be used in other aspects, and may comprise structural or logical changes not depicted in the accompanying drawings. Therefore, the following detailed descriptions shall not be construed as limitative, and the scope of this disclosure is defined by the appended claims. For example, it should be understood that disclosed content with reference to a described method may also hold true for a corresponding device or system configured to perform the method, and vice versa. For example, if one or more specific method steps are described, a corresponding device may comprise one or more units such as functional units for performing the described one or more method steps (for example, one unit performs the one or more steps; or each of a plurality of units performs one or more of the plurality of steps), even if such one or more units are not explicitly described or illustrated in the accompanying drawings. In addition, for example, if a specific apparatus is described based on one or more units such as a functional unit, a corresponding method may comprise one step used to perform a functionality or functionalities of one or more units (for example, a step used to perform a functionality or functionalities of one or more units; or each of a plurality of steps is used to perform a functionality or functionalities of one or more units in a plurality of units), even if such one or a plurality of steps are not explicitly described or illustrated in the accompanying drawings. Further, it should be understood that features of the various example embodiments and/or aspects described in this specification may be combined with each other, unless otherwise specified.

The technical solutions related to the embodiments of this disclosure may not only be applied to existing video coding standards (for example, standards such as H.264 and HEVC), but also be applied to future video coding standards (for example, the H.266 standard). Terms used in implementations of this disclosure are merely intended to explain specific embodiments of this disclosure, and are not intended to limit this disclosure. The following first briefly describes related concepts in the embodiments of this disclosure.

Video coding typically refers to processing of a sequence of pictures, where the sequence of pictures forms a video or a video sequence. In the field of video coding, the terms "picture", "frame", and "image" may be used as synonyms. Video coding used in this specification refers to video encoding or video decoding. Video encoding is performed on a source side, and typically comprises processing (for example, by compressing) an original video picture to reduce an amount of data required for representing the video picture, for more efficient storage and/or transmission. Video decoding is performed on a destination side, and typically comprises inverse processing in comparison with processing of the encoder to reconstruct the video picture. "Coding" of a video picture in the embodiments should be understood as "encoding" or "decoding" of a video sequence. A combination of an encoding part and a decoding part is also referred to as CODEC (encoding and decoding).

A video sequence comprises a series of pictures, the picture is further split into slices, and the slice is further split into blocks. Video coding processing is performed by blocks. In some new video coding standards, the concept "block" is further extended. For example, a macroblock (MB) is introduced in the H.264 standard. The macroblock may be further split into a plurality of prediction blocks (partition) for prediction coding. In the high efficiency video coding (HEVC) standard, basic concepts such as a "coding unit" (CU), a "prediction unit" (PU), and a "transform unit" (TU) are used, a plurality of block units are obtained through functional division, and a brand-new tree-based structure is used for description. For example, a CU may be split into smaller CUs through quadtree split, and the smaller CU may be further split to form a quadtree structure. A CU is a basic unit for splitting and coding of a coding picture. For the PU and the TU, there may be also similar tree structures. The PU may correspond to a prediction block, and is a basic unit for prediction coding. The CU is further partitioned into a plurality of PUs in a partition mode. The TU may correspond to a transform block, and is a basic unit for transforming a prediction residual. However, all of the CU, the PU, and the TU are concepts of blocks (or picture blocks) in essence.

For example, in HEVC, a CTU is split into a plurality of CUs by using a quadtree structure represented as a coding tree. A decision on coding of a picture region through inter-picture (temporal) or intra-picture (spatial) prediction is made at a CU depth. Each CU may be further partitioned into one, two, or four PUs in a PU partitioning pattern. Inside one PU, a same prediction process is applied, and related information is transmitted to a decoder on a PU basis. After obtaining a residual block by applying the prediction process based on the PU partitioning pattern, the CU may be partitioned into transform units (TU) based on another quadtree structure similar to the coding tree used for the CU. In the recent development of video compression technologies, a quadtree and binary tree (QTBT) partition frame is used to partition a coding block. In a QTBT block structure, the CU may be square or rectangular.

In this specification, for ease of description and understanding, a to-be-coded picture block in a current coding picture may be referred to as a current block. For example, in terms of encoding, the current block is a block that is currently being encoded; and in terms of decoding, the current block is a block that is currently being decoded. A decoded picture block, in a reference picture, used to predict the current block is referred to as a reference block. In other words, the reference block is a block that provides a reference signal for the current block, and the reference signal represents a pixel value in the picture block. A block that provides a prediction signal for the current block in the reference picture may be referred to as a prediction block. The prediction signal represents a pixel value, a sample value, or a sample signal in the prediction block. For example, an optimal reference block is found after a plurality of reference blocks are traversed, the optimal reference block provides prediction for the current block, and this block is referred to as a prediction block.

In a case of lossless video coding, an original video picture can be reconstructed. In other words, a reconstructed video picture has same quality as the original video picture (assuming that no transmission loss or other data loss occurs during storage or transmission). In a case of lossy video coding, further compression is performed through, for example, quantization, to reduce an amount of data required for representing a video picture, and the video picture cannot be completely reconstructed on a decoder side. In other words, quality of a reconstructed video picture is lower or poorer than that of the original video picture.

Several H.261 video coding standards are used for "lossy hybrid video coding" (that is, spatial and temporal prediction in a sample domain is combined with 2D transform coding for applying quantization in a transform domain). Each picture of a video sequence is typically partitioned into a set of non-overlapping blocks, and coding is typically performed at a block level. In other words, on an encoder side, a video is typically processed, that is, encoded, at a block (video block) level, for example, by using spatial (intra-picture) prediction and/or temporal (inter-picture) prediction to generate a prediction block, subtracting the prediction block from a current block (a block that is currently being processed or to be processed) to obtain a residual block, and transforming the residual block and quantizing the residual block in the transform domain to reduce an amount of data to be transmitted (compressed), whereas on the decoder side, inverse processing in comparison with processing of the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, subsequent blocks.

The following describes a system architecture to which an embodiment of this disclosure is applied. FIG. 1A is a schematic block diagram of an example of a video coding system 10 to which an embodiment of this disclosure is applied. As shown in FIG. 1A, the video coding system 10 may comprise a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. The source device 12, the destination device 14, or various implementation solutions of the source device 12 or the destination device 14 may comprise one or more processors and a memory coupled to the one or more processors. The memory may comprise but is not limited to a RAM, a ROM, an EEPROM, a flash memory, or any other medium that can be used to store desired program code in a form of an instruction or a data structure accessible by a computer, as described in this specification. The source device 12 and the destination device 14 may comprise various apparatuses, including a desktop computer, a mobile computing apparatus, a notebook (for example, a laptop) computer, a tablet computer, a set top box, a handheld telephone such as a "smartphone", a television set, a camera, a display apparatus, a digital media player, a video game console, an in-vehicle computer, a wireless communications device, or a similar apparatus.

Although FIG. 1A depicts the source device 12 and the destination device 14 as separate devices, embodiments of devices may also comprise both or both functionalities: the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

A communication connection between the source device 12 and the destination device 14 may be implemented through a link 13, and the destination device 14 may receive the encoded video data from the source device 12 through the link 13. The link 13 may comprise one or more media or apparatuses capable of moving the encoded video data from the source device 12 to the destination device 14. In an example, the link 13 may comprise one or more communications media that enable the source device 12 to directly transmit the encoded video data to the destination device 14 in real time. In this example, the source device 12 may modulate the encoded video data according to a communication standard (for example, a wireless communication protocol), and may transmit modulated video data to the destination device 14. The one or more communications media may comprise a wireless communications medium and/or a wired communications medium, for example, a radio frequency (RF) spectrum or one or more physical transmission lines. The one or more communications media may constitute a part of a packet-based network, and the packet-based network is, for example, a local area network, a wide area network, or a global network (for example, the internet). The one or more communications media may comprise a router, a switch, a base station, or another device that facilitates communication from the source device 12 to the destination device 14.

The source device 12 comprises an encoder 20, and optionally, the source device 12 may further comprise a picture source 16, a picture pre-processor 18, and a communications interface 22. In a specific implementation form, the encoder 20, the picture source 16, the picture pre-processor 18, and the communications interface 22 may be hardware components in the source device 12, or may be software programs on the source device 12. Separate descriptions are as follows.

The picture source 16 may comprise or be any type of picture capture device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera configured to capture a picture or a memory configured to store a picture. The picture source 16 may further include any type of (internal or external) interface for storing previously captured or generated picture and/or for obtaining or receiving a picture. When the picture source 16 is a camera, the picture source 16 may be, for example, a local camera or an integrated camera integrated into the source device. When the picture source 16 is a memory, the picture source 16 may be, for example, a local memory or an integrated memory integrated into the source device. When the picture source 16 includes an interface, the interface may be, for example, an external interface for receiving a picture from an external video source. The external video source is, for example, an external picture capture device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture element). The picture element in the array may also be referred to as a sample. A quantity of samples in horizontal and vertical directions (or axes) of the array or the picture defines a size and/or a resolution of the picture. For representation of a color, three color components are typically used. For example, the picture may be represented as or include three sample arrays. For example, in an RGB format or a color space, a picture includes corresponding red, green, and blue sample arrays. However, in video coding, each pixel is typically represented in a luminance/chrominance format or a color space. For example, a picture in a YUV format includes a luminance component indicated by Y (sometimes L is used instead) and two chrominance components indicated by U and V. The luminance (luma) component Y represents brightness or gray level intensity (for example, the two are identical in a gray-scale picture), while the two chrominance (chroma) components U and V represent chromaticity or color information components. Accordingly, the picture in the YUV format includes a luma sample array of luma sample values (Y) and two chroma sample arrays of chroma values (U and V). A picture in the RGB format may be converted or transformed into a picture in the YUV format and vice versa, and the process is also known as color transformation or conversion. If a picture is monochrome, the picture may include only a luma sample array. In this embodiment of this disclosure, a picture transmitted by the picture source 16 to a picture processor may also be referred to as raw picture data 17.

The picture pre-processor 18 is configured to receive the raw picture data 17 and pre-process the raw picture data 17, to obtain a pre-processed picture 19 or pre-processed picture data 19. For example, the pre-processing performed by the picture pre-processor 18 may include trimming, color format conversion (for example, from an RGB format to a YUV format), color correction, or de-noising.

The encoder 20 (also referred to as a video encoder 20) is configured to receive the pre-processed picture data 19, and process the pre-processed picture data 19 by using a related prediction mode (such as a prediction mode in each embodiment of this specification), to provide encoded picture data 21 (structural details of the encoder 20 are further described below based on FIG. 2, FIG. 4, or FIG. 5). In some embodiments, the encoder 20 may be configured to perform the embodiments described below, to implement application of the method for obtaining a candidate motion vector list on the encoder side described in this disclosure.

The communications interface 22 may be configured to receive the encoded picture data 21, and transmit the encoded picture data 21 to the destination device 14 or any other device (for example, a memory) through the link 13 for storage or direct reconstruction. The any other device may be any device used for decoding or storage. The communications interface 22 may be, for example, configured to package the encoded picture data 21 into an appropriate format, for example, a data packet, for transmission through the link 13.

The destination device 14 comprises a decoder 30, and optionally, the destination device 14 may further comprise a communications interface 28, a picture post-processor 32, and a display device 34. Separate descriptions are as follows.

The communications interface 28 may be configured to receive the encoded picture data 21 from the source device 12 or any other source. The any other source is, for example, a storage device, and the storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection, and the any type of network is, for example, a wired or wireless network or any combination thereof, or any type of private or public network, or any combination thereof. The communications interface 28 may be, for example, configured to de-package the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to set up a connection, and acknowledge and exchange any other information related to a communication link and/or data transmission such as encoded picture data transmission.

The decoder 30 (also referred to as the decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform the embodiments described below, to implement application of the method for obtaining a candidate motion vector list on the decoder side described in this disclosure.

The picture post-processor 32 is configured to post-process the decoded picture data 31 (also referred to as reconstructed picture data), to obtain post-processed picture data 33. The post-processing performed by the picture post-processor 32 may comprise color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or comprise any type of display configured to present a reconstructed picture, for example, may be an integrated or external display or monitor. For example, the display may comprise a liquid crystal display (LCD), an organic light emitting diode (OLED) display, a plasma display, a projector, a micro LED display, a liquid crystal on silicon (LCoS), a digital light processor (DLP), or any other type of display.

A person skilled in the art may be learned that based on the descriptions, existence and (exact) division into functionalities of the different units or functionalities of the source device 12 and/or the destination device 14 shown in FIG. 1A may vary depending on an actual device and application. The source device 12 and the destination device 14 each may be any one of a wide range of devices, including any type of handheld or stationary device, for example, a notebook or laptop computer, a mobile phone, a smartphone, a pad or a tablet computer, a video camera, a desktop computer, a set top box, a television, a camera, a vehicle-mounted device, a display device, a digital media player, a video game console, a video streaming device (such as a content service server or a content distribution server), a broadcast receiver device, or a broadcast transmitter device, and may not use or may use any type of operating system.

The encoder 20 and the decoder 30 each may be implemented as any of various appropriate circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store a software instruction in an appropriate and non-transitory computer-readable storage medium and may execute an instruction by using hardware such as one or more processors, to perform the technologies of this disclosure. Any of the foregoing content (including hardware, software, a combination of hardware and software, and the like) may be considered as one or more processors.

In some cases, the video coding system 10 shown in FIG. 1A is merely an example and the technologies in this disclosure are applicable to video coding settings (for example, video encoding or video decoding) that do not necessarily comprise any data communication between the encoding device and the decoding device. In other examples, data may be retrieved from a local memory, streamed over a network, or the like. A video encoding device may encode data and store encoded data into the memory, and/or a video decoding device may retrieve data from the memory and decode the data. In some examples, encoding and decoding are performed by devices that do not communicate with each other but simply encode data to the memory and/or retrieve data from the memory and decode the data.

Figure 1B:
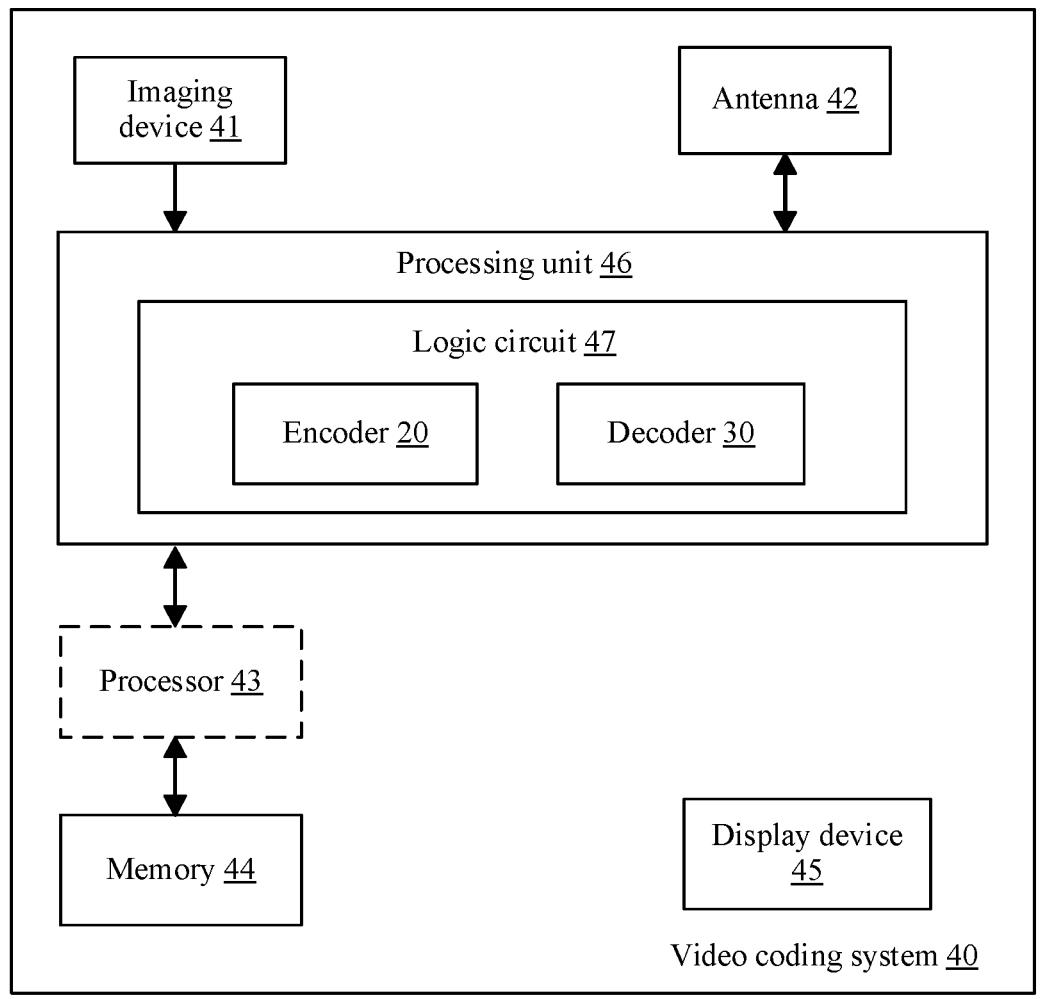
FIG. 1B is a block diagram of an example of a video coding system 40 for implementing an embodiment of this disclosure.
Figure 2:
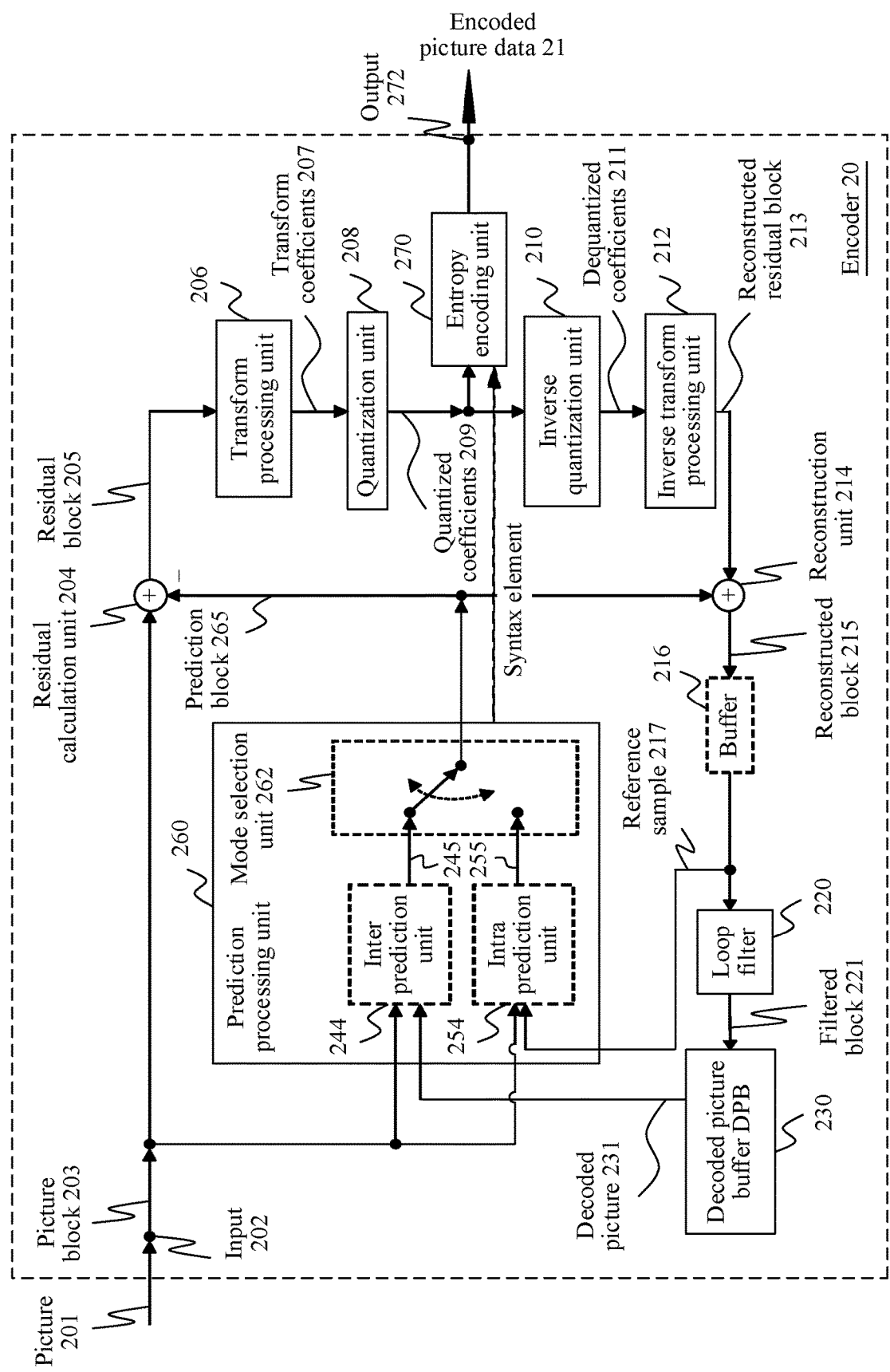
FIG. 2 is a block diagram of an example structure of an encoder 20 for implementing an embodiment of this disclosure.
Figure 3:
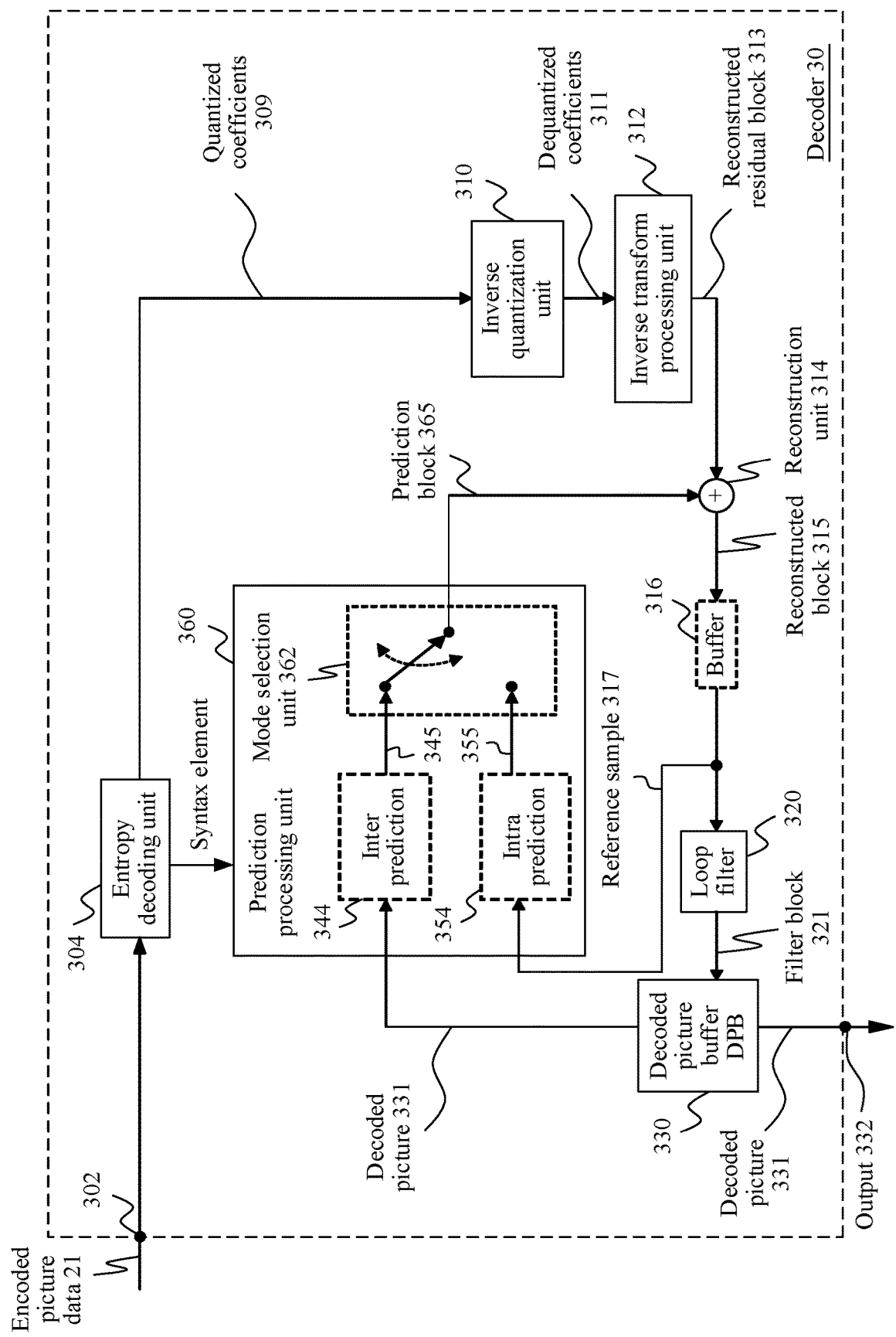
FIG. 3 is a block diagram of an example structure of a decoder 30 for implementing an embodiment of this disclosure.

FIG. 1B is an illustrative diagram of an example of a video coding system 40, including the encoder 20 in FIG. 2 and/or the decoder 30 in FIG. 3, according to an example embodiment. The video coding system 40 can implement a combination of various technologies in the embodiments of this disclosure. In an illustrated implementation, the video coding system 40 may comprise an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated by using the encoder 20 and the decoder 30, the video coding system 40 may comprise only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may comprise an application-specific integrated circuit (ASIC) logic, a graphics processor, a general-purpose processor, or the like. The video coding system 40 may alternatively comprise the optional processor 43. The optional processor 43 may similarly comprise an application-specific integrated circuit (ASIC) logic, a graphics processor, a general purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM), a dynamic random access memory (DRAM)), or a nonvolatile memory (for example, a flash memory). In a non-limiting example, the memory 44 may be implemented by a cache memory. In some examples, the logic circuit 47 may access the memory 44 (for example, for implementation of a picture buffer). In other examples, the logic circuit 47 and/or the processing unit 46 may comprise a memory (for example, a cache) for implementation of a picture buffer or the like.

In some examples, the encoder 20 implemented by the logic circuit may comprise a picture buffer (for example, implemented by the processing unit 46 or the memory 44) and a graphics processing unit (for example, implemented by the processing unit 46). The graphics processing unit may be communicatively coupled to the picture buffer. The graphics processing unit may to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by the logic circuit may comprise a picture buffer (for example, implemented by the processing unit 46 or the memory 44) and a graphics processing unit (for example, implemented by the processing unit 46). The graphics processing unit may be communicatively coupled to the picture buffer. The graphics processing unit may to implement various modules that are described with reference to FIG. 3 and/or any other decoder system or subsystem described in this specification.

In some examples, the antenna 42 may be configured to receive an encoded bitstream of video data. As described, the encoded bitstream may comprise data, an indicator, an index value, mode selection data, or the like related to video frame coding described in this specification, for example, data related to coding partitioning (for example, a transform coefficient or a quantized transform coefficient, an optional indicator (as described), and/or data defining the coding partitioning). The video coding system 40 may further comprise the decoder 30 that is coupled to the antenna 42 and that is configured to decode the encoded bitstream. The display device 45 is configured to present a video frame.

It should be understood that in this embodiment of this disclosure, for the example described with reference to the encoder 20, the decoder 30 may be configured to perform a reverse process. With regard to a signaling syntax element, the decoder 30 may be configured to receive and parse such a syntax element and correspondingly decode related video data. In some examples, the encoder 20 may entropy encode the syntax element into an encoded video bitstream. In such examples, the decoder 30 may parse such a syntax element and correspondingly decode related video data.

It should be noted that the method for obtaining a candidate motion vector list described in the embodiments of this disclosure is mainly used in an inter prediction process, and the process exists on both the encoder 20 and the decoder 30. The encoder 20/the decoder 30 in the embodiments of this disclosure may be an encoder/decoder corresponding to a video standard protocol such as H.263, H.264, HEVC, MPEG-2, MPEG-4, VP8, or VP9, or corresponding to a next-generation video standard protocol (such as H.266).

FIG. 2 is a schematic/conceptual block diagram of an example of an encoder 20 configured to implement an embodiment of this disclosure In the example of FIG. 2, the encoder 20 comprises a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may comprise an inter prediction unit 244, an intra prediction unit 254, and a mode selection unit 262. The inter prediction unit 244 may comprise a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to the decoder 30 in FIG. 3).

The encoder 20 receives, for example, through an input 202, a picture 201 or a picture block 203 of a picture 201, for example, a picture in a sequence of pictures forming a video or a video sequence. The picture block 203 may also be referred to as a current picture block or a to-be-encoded picture block. The picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also comprises the current picture).

The encoder 20 in an embodiment may comprise a partitioning unit (not shown in FIG. 2), configured to partition the picture 201 into a plurality of blocks such as the picture block 203. The picture 201 is usually partitioned into a plurality of non-overlapping blocks. The partitioning unit may be configured to use a same block size for all pictures in a video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning techniques described above.

Like the picture 201, the picture block 203 is also or may be considered as a two-dimensional array or matrix of samples with sample values, although a size of the picture block 203 is smaller than that of the picture 201. In other words, the picture block 203 may comprise, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the picture block 203 defines the size of the picture block 203.

The encoder 20 shown in FIG. 2 is configured to encode the picture 201 block by block, for example, encode and predict each picture block 203.

The residual calculation unit 204 is configured to calculate a residual block 205 based on the picture block 203 and a prediction block 265 (further details about the prediction block 265 are provided below), for example, obtain the residual block 205 in a sample domain by subtracting a sample value of the prediction block 265 from a sample value of the picture block 203 sample by sample (pixel by pixel).

The transform processing unit 206 is configured to apply a transform, for example, a discrete cosine transform (DCT) or a discrete sine transform (DST), to sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply an integer approximation of DCT/DST, such as transforms specified in HEVC/H.265. In comparison with an orthogonal DCT transform, such an integer approximation is typically scaled by a specific factor. To preserve a norm of a residual block that is processed through forward and inverse transforms, applying an additional scale factor is a part of a transform process. The scale factor is typically chosen based on some constraints. For example, the scale factor is a power of two for a shift operation, a bit depth of the transform coefficient, a tradeoff between accuracy and implementation costs, and the like. A specific scaling factor is, for example, specified for an inverse transform, for example, by the inverse transform processing unit 212 on the decoder side 30 (and the corresponding inverse transform, for example, by the inverse transform processing unit 212 on the encoder side 20), and a corresponding scaling factor for the forward transform, for example, by the transform processing unit 206 on the encoder side 20 may be specified accordingly.

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. A quantization process may reduce a bit depth associated with some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, whereas a larger quantization step corresponds to coarser quantization. An appropriate quantization step size may be indicated by the quantization parameter (QP). The quantization parameter may be, for example, an index to a predefined set of appropriate quantization step sizes. For example, a smaller quantization parameter may correspond to finer quantization (a smaller quantization step size) and a larger quantization parameter may correspond to coarser quantization (a larger quantization step size) or vice versa. The quantization may comprise division by a quantization step size and a corresponding quantization and/or the inverse quantization, for example, performed by the inverse quantization unit 210, or may comprise multiplication by the quantization step size. In embodiments according to some standards such as HEVC, a quantization parameter may be used to determine the quantization step size. Generally, the quantization step size may be calculated based on a quantization parameter by using a fixed point approximation of an equation including division. An additional scaling factor may be introduced for quantization and dequantization to restore the norm of the residual block, where the norm of the residual block may be modified because of a scale used in the fixed point approximation of the equation for the quantization step size and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step size.

The inverse quantization unit 210 is configured to apply inverse quantization of the quantization unit 208 to the quantized coefficients to obtain dequantized coefficients 211, for example, apply, based on or by using a same quantization step size as the quantization unit 208, an inverse quantization scheme of a quantization scheme applied by the quantization unit 208. The dequantized coefficients 211 may also be referred to as dequantized residual coefficients 211 and correspond, although typically not identical to the transform coefficients due to the loss by quantization, to the transform coefficients 207.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (namely, a reconstructed residual block 213) to the prediction block 265 to obtain a reconstructed block 215 in a sample domain, for example, by adding a sample value of the reconstructed residual block 213 and the sample value of the prediction block 265.

Optionally, a buffer unit 216 ("buffer" 216 for short) of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, the encoder 20 in an embodiment may be configured so that the buffer unit 216 is not only used for storing the reconstructed block 215 for the intra prediction unit 254 but also used for the loop filter unit 220 (not shown in FIG. 2), and/or so that, for example, the buffer unit 216 and the decoded picture buffer unit 230 form one buffer. In other embodiments, a filtered block 221 and/or a block or a sample from the decoded picture buffer 230 (the block or sample is not shown in FIG. 2) are/is used as an input or a basis for the intra prediction unit 254.

The loop filter unit 220 (briefly referred to as a "loop filter" 220) is configured to filter the reconstructed block 215 to obtain the filtered block 221, to smooth pixel transition or improve video quality. The loop filter unit 220 is intended to represent one or more loop filters including, for example, a de-blocking filter, a sample-adaptive offset (SAO) filter, or another filter such as a bilateral filter, an adaptive loop filter (ALF), a sharpening or smoothing filter, or a collaborative filter. Although the loop filter unit 220 is shown in FIG. 2 as an in loop filter, in another configuration, the loop filter unit 220 may be implemented as a post loop filter. The filtered block 221 may also be referred to as a filtered and reconstructed block 221. The decoded picture buffer 230 may store a reconstructed encoded block after the loop filter unit 220 performs a filtering operation on the reconstructed encoded block.

The encoder 20 (correspondingly, the loop filter unit 220) in an embodiment may be configured to output a loop filter parameter (such as sample adaptive offset information), for example, directly or after entropy encoding performed by the entropy encoding unit 270 or any other entropy encoding unit, so that, for example, the decoder 30 may receive the same loop filter parameter and apply the same loop filter parameter to decoding.

The decoded picture buffer (DPB) 230 may be a reference picture memory that stores reference picture data for encoding video data encoding by the encoder 20. The DPB 230 may be formed by any one of a variety of memory devices, such as a dynamic random access memory (DRAM) (including a synchronous DRAM (SDRAM), a magnetoresistive RAM (MRAM), and a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may be further configured to store another previously filtered block, for example, the previously reconstructed and filtered block 221, of the same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of a same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra-prediction mode or an inter prediction mode) and/or the corresponding prediction block 245 or 255 to be used as the prediction block 265, to calculate the residual block 205 and to reconstruct the reconstructed block 215.

The mode selection unit 262 in an embodiment may be configured to select the prediction mode (for example, from prediction modes supported by the prediction processing unit 260), where the prediction mode provides an optimal match or a smaller residual (the smaller residual means better compression for transmission or storage), or provides smaller signaling overheads (the smaller signaling overheads mean better compression for transmission or storage), or considers or balances both. The mode selection unit 262 may be configured to determine the prediction mode based on rate distortion optimization (RDO), that is, select a prediction mode that provides minimum rate distortion optimization or select a prediction mode for which related rate distortion at least satisfies a prediction mode selection criterion.

In the following, prediction processing performed (for example, by using the prediction processing unit 260) and mode selection performed (for example, by using the mode selection unit 262) according to an example of the encoder 20 are described in more detail.

As described above, the encoder 20 is configured to determine or select an optimal or optimum prediction mode from a set of (pre-determined) prediction modes. The set of prediction modes may comprise, for example, an intra prediction mode and/or an inter prediction mode.

A set of intra prediction modes may comprise 35 different intra prediction modes, for example, non-directional modes such as a DC (or mean) mode and a planar mode, or directional modes defined in H.265, or may comprise 67 different intra prediction modes, for example, non-directional modes such as a DC (or mean) mode and a planar mode, or directional modes defined in the developing H.266.

In a possible implementation, a set of inter prediction modes depends on available reference pictures (that is, at least some of decoded pictures stored in the DBP 230 as described above) and other inter prediction parameters, for example, depend on whether an entire reference picture is used or only a part of a reference picture is used, for example, an optimum matched reference block that is found in a search window region surrounding a region of a current block, and/or, for example, depend on whether pixel interpolation such as half-pixel and/or quarter-pixel interpolation is applied. The set of inter prediction modes may comprise, for example, an advanced motion vector (AMVP) mode and a merge mode. In specific implementation, the set of inter prediction modes may comprise an improved control point-based AMVP mode and an improved control point-based merge mode in this embodiment of this disclosure. In an example, the intra prediction unit 254 may be configured to perform any combination of the following described inter prediction technologies described below.

In addition to the foregoing prediction modes, a skip mode and/or a direct mode may also be used in this embodiment of this disclosure.

The prediction processing unit 260 may be further configured to partition the picture block 203 into smaller block partitions or subblocks, for example, by iteratively using quad-tree (QT) partitioning, binary-tree (BT) partitioning, triple-tree (TT) partitioning, or any combination thereof, and to perform, for example, prediction on each of the block partitions or subblocks, where mode selection comprises selection of a tree structure of the partitioned picture block 203 and selection of a prediction mode applied to each of the block partitions or subblocks.

The inter prediction unit 244 may comprise a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, a reconstructed block of one or more other/different previously decoded pictures 231, for motion estimation. For example, a video sequence may comprise the current picture and a previously decoded picture 31. In other words, the current picture and the previously decoded picture 31 may be a part of or form a sequence of pictures forming a video sequence.

For example, the encoder 20 may be configured to select a reference block from a plurality of reference blocks of a same picture or different pictures of a plurality of other pictures and provide, to the motion estimation unit (not shown in FIG. 2), a reference picture and/or provide an offset (a spatial offset) between a location (coordinates X and Y) of the reference block and a location of the current block as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may comprise fetching or generating the prediction block based on a motion vector or block vector determined through motion estimation (possibly performing interpolations for sub-pixel precision). Interpolation filtering may generate an additional pixel sample from a known pixel sample, thereby potentially increasing a quantity of candidate prediction blocks that may be used to code a picture block. Upon receiving a motion vector for a PU of the current picture block, the motion compensation unit 246 may locate a prediction block to which the motion vector points in one reference picture list. The motion compensation unit 246 may further generate a syntax element associated with a block and a video slice, for decoding a picture block of the video slice by the decoder 30.

Specifically, the inter prediction unit 244 may transmit the syntax element to the entropy encoding unit 270, where the syntax element comprises an inter prediction parameter (for example, indication information of an inter prediction mode that is selected for prediction for the current block after a plurality of inter prediction modes are traversed). In a possible application scenario, if there is only one inter prediction mode, the inter prediction parameter may alternatively not be carried in the syntax element. In this case, the decoder side 30 may directly use the default prediction mode for decoding. It may be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

The encoder 20 in an embodiment may be configured to select an intra prediction mode according to an optimization criterion, for example, based on a smaller residual (for example, an intra prediction mode that provides a prediction block 255 that is most similar to the current picture block 203) or minimum bit rate distortion.

The intra prediction unit 254 is further configured to determine the intra prediction block 255 based on, for example, an intra prediction parameter of the selected intra prediction mode. In any case, after selecting an intra-prediction mode for a block, the intra prediction unit 254 is further configured to provide an intra prediction parameter, namely, information indicating the selected intra-prediction mode for the block, for the entropy encoding unit 270. In an example, the intra prediction unit 254 may be configured to perform any combination of the intra prediction technologies.

Specifically, the intra prediction unit 254 may transmit a syntax element to the entropy encoding unit 270, where the syntax element comprises an intra prediction parameter (for example, indication information of an intra prediction mode that is selected for prediction for the current block after a plurality of intra prediction modes are traversed). In a possible application scenario, if there is only one intra prediction mode, the intra prediction parameter may alternatively not be carried in the syntax element. In this case, the decoder side 30 may directly use the default prediction mode for decoding.

The entropy encoding unit 270 is configured to apply (or bypass) an entropy encoding algorithm or a scheme (for example, a variable length coding (VLC) scheme, a context adaptive VLC (CAVLC) scheme, an arithmetic coding scheme, a context adaptive binary arithmetic coding (CABAC), syntax-based context-adaptive binary arithmetic coding (SBAC), probability interval partitioning entropy (PIPE) coding, or another entropy coding methodology or technique) on one or all of the following: the quantized coefficients 209, the inter prediction parameter, the intra prediction parameter, and/or the loop filter parameter, to obtain the encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode another syntax element for a current video slice that is being encoded.

Other structural variations of the video encoder 20 may be configured to encode a video stream. For example, a non-transform based encoder 20 may quantize a residual signal directly without the transform processing unit 206 for some blocks or frames. In another implementation, the encoder 20 may have the quantization unit 208 and the inverse quantization unit 210 that are combined into a single unit.

Specifically, in this embodiment of this disclosure, the encoder 20 may be configured to implement a method for obtaining a candidate motion vector list described in the following embodiment.

It should be understood that other structural variations of the video encoder 20 may be configured to encode a video stream. For example, for some picture blocks or picture frames, the video encoder 20 may quantize the residual signal directly without processing by the transform processing unit 206, and accordingly, without processing by the inverse transform processing unit 212. Alternatively, for some picture blocks or picture frames, the video encoder 20 does not generate residual data, and accordingly, the transform processing unit 206, the quantization unit 208, the inverse quantization unit 210, and the inverse transform processing unit 212 do not need to perform processing. Alternatively, the video encoder 20 may directly store a reconstructed picture block as a reference block, without processing by the filter 220. Alternatively, the quantization unit 208 and the inverse quantization unit 210 in the video encoder 20 may be combined together. The loop filter 220 is optional, and in a case of lossless compression coding, the transform processing unit 206, the quantization unit 208, the inverse quantization unit 210, and the inverse transform processing unit 212 are optional. It should be understood that, according to different application scenarios, the inter prediction unit 244 and the intra prediction unit 254 may be used selectively enabled.

FIG. 3 is a schematic/conceptual block diagram of an example of a decoder 30 configured to implement an embodiment of this disclosure. The video decoder 30 is configured to receive encoded picture data (for example, an encoded bitstream) 21, for example, obtained through encoding by an encoder 20, to obtain a decoded picture 231. During decoding, the video decoder 30 receives video data from the video encoder 20, for example, an encoded video bitstream that represents a picture block of an encoded video slice, and an associated syntax element.

In the example of FIG. 3, the decoder 30 comprises an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may comprise an inter prediction unit 344, an intra prediction unit 354, and a mode selection unit 362. In some examples, the video decoder 30 may perform a decoding process that is roughly inverse to the encoding process described with reference to the video encoder 20 in FIG. 2.

The entropy decoding unit 304 is configured to entropy decode the encoded picture data 21 to obtain, for example, quantized coefficients 309 and/or decoded coding parameters (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 210. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may comprise the inter prediction unit 344 and the intra prediction unit 354. The inter prediction unit 344 may be similar to the inter prediction unit 244 in functions, and the intra prediction unit 354 may be similar to the intra prediction unit 254 in functions. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 for a picture block of the current video slice based on a signaled intra-prediction mode and data that is from a previously decoded block of a current frame or picture. When a video frame is encoded as an inter-encoded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one of reference pictures in one reference picture list. The video decoder 30 may construct reference frame lists: a list 0 and a list 1, by using a default construction technique based on a reference picture stored in the DPB 330.

The prediction processing unit 360 is configured to determine prediction information for the video block of the current video slice by parsing the motion vector and the another syntax element, and use the prediction information to generate a prediction block for the current video block that is being decoded. In an example of this disclosure, the prediction processing unit 360 uses some of received syntax elements to determine a prediction mode (for example, intra prediction or inter prediction) used to code the video block of the video slice, an inter prediction slice type (for example, a B slice, a P slice, or a GPB slice), construction information for one or more of the reference picture lists for the slice, a motion vector for each inter coded video block of the slice, an inter prediction status for each inter-coded video block of the slice, and other information, to decode the video block of the current video slice. In another example of this disclosure, the syntax elements received by the video decoder 30 from a bitstream comprise syntax elements in one or more of an adaptive parameter set (adaptive parameter set, APS), a sequence parameter set (sequence parameter set, SPS), a picture parameter set (picture parameter set, PPS), or a slice header.

The inverse quantization unit 310 may be configured to inverse quantize (that is, dequantize) a quantized transform coefficient provided in the bitstream and decoded by the entropy decoding unit 304. An inverse quantization process may comprise: using a quantization parameter calculated by the video encoder 20 for each video block in the video slice, to determine a quantization degree that should be applied and likewise, determine an inverse quantization degree that should be applied.

The inverse transform processing unit 312 is configured to apply an inverse transform (for example, an inverse DCT, an inverse integer transform, or a conceptually similar inverse transform process) to the transform coefficient to generate a residual block in a pixel domain.

The reconstruction unit 314 (for example, the summer 314) is configured to add an inverse transform block 313 (that is, a reconstructed residual block 313) to the prediction block 365 to obtain a reconstructed block 315 in the sample domain, for example, by adding a sample value of the reconstructed residual block 313 and a sample value of the prediction block 365.

The loop filter unit 320 (during a coding loop or after a coding loop) is configured to filter the reconstructed block 315 to obtain a filtered block 321, to smooth pixel transition or improve video quality. In an example, the loop filter unit 320 may be configured to perform any combination of filtering techniques described below. The loop filter unit 320 is intended to represent one or more loop filters including, for example, a de-blocking filter, a sample-adaptive offset (sample-adaptive offset, SAO) filter, or another filter such as a bilateral filter, an adaptive loop filter (adaptive loop filter, ALF), a sharpening or smoothing filter, or a collaborative filter. Although the loop filter unit 320 is shown in FIG. 3 as an in loop filter, in another configuration, the loop filter unit 320 may be implemented as a post loop filter.

The decoded video block 321 in a given frame or picture is then stored in the decoded picture buffer 330 that stores a reference picture used for subsequent motion compensation.

The decoder 30 is configured to, for example, output a decoded picture 31 through an output 332, for presentation to a user or viewing by a user.

Other variations of the video decoder 30 may be configured to decode a compressed bitstream. For example, the decoder 30 may generate an output video stream without processing by the loop filter unit 320. For example, a non-transform based decoder 30 may inversely quantize a residual signal directly without the inverse transform processing unit 312 for some blocks or frames. In another implementation, the video decoder 30 may have the inverse quantization unit 310 and the inverse transform processing unit 312 that are combined into a single unit.

Specifically, in this embodiment of this disclosure, the decoder 30 is configured to implement a method for obtaining a candidate motion vector list described in the following embodiment.

It should be understood that other structural variations of the video decoder 30 may be configured to decode the encoded video bitstream. For example, the video decoder 30 may generate an output video stream without processing by the filter 320. Alternatively, for some picture blocks or picture frames, the entropy decoding unit 304 of the video decoder 30 does not obtain a quantized coefficient through decoding, and accordingly, the inverse quantization unit 310 and the inverse transform processing unit 312 do not need to perform processing. The loop filter 320 is optional. In a case of lossless compression, the inverse quantization unit 310 and the inverse transform processing unit 312 are optional. It should be understood that, according to different application scenarios, the inter prediction unit and the intra prediction unit may be used selectively enabled.

Figure 4:
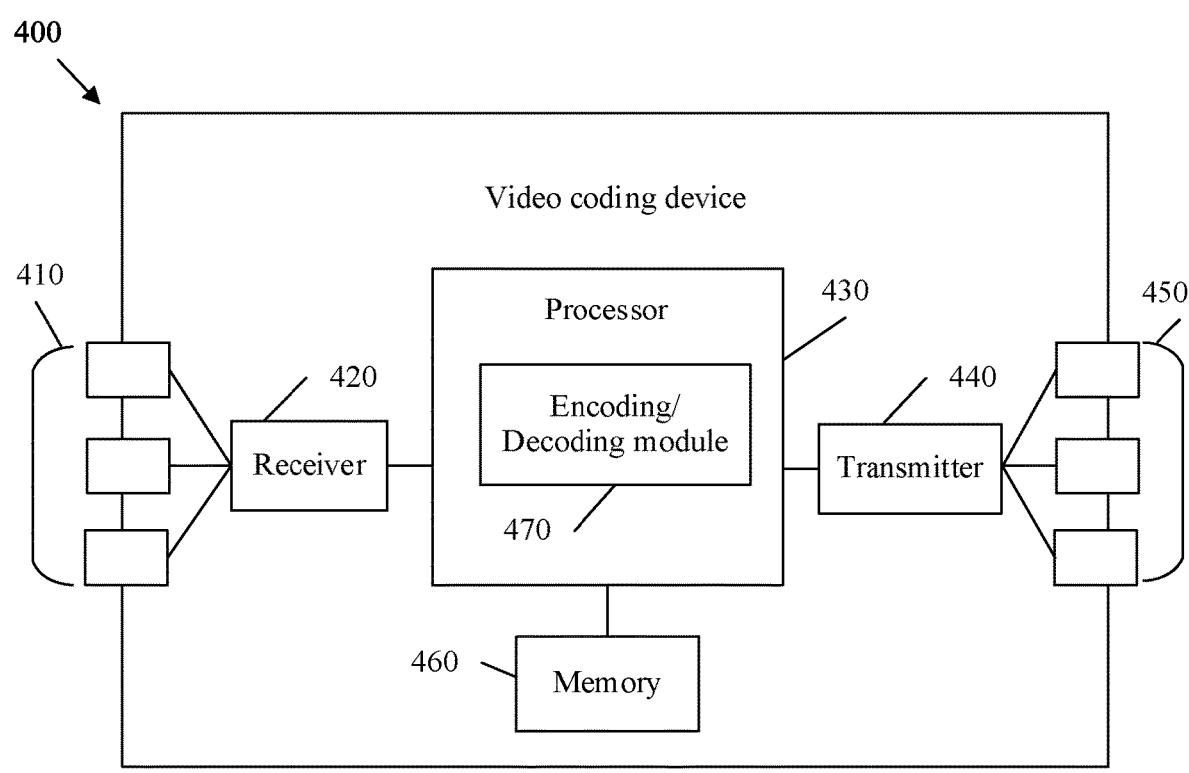
FIG. 4 is a block diagram of an example of a video coding device 400 for implementing an embodiment of this disclosure.

FIG. 4 is a schematic structural diagram of a video coding device 400 (for example, a video encoding device 400 or a video decoding device 400) according to an embodiment of this disclosure. The video coding device 400 is suitable for implementing an embodiment described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 comprises: ingress ports 410 and a receiver unit (Rx) 420 that are configured to receive data; a processor, a logic unit, or a central processing unit (CPU) 430 that is configured to process data; a transmitter unit (Tx) 440 and egress ports 450 that are configured to transmit data; and a memory 460 configured to store data. The video coding device 400 may further comprise an optical-to-electrical component and an electrical-to-optical (EO) component that are coupled to the ingress ports 410, the receiver unit 420, the transmitter unit 440, and the egress ports 450, for egress or ingress of an optical signal or an electrical signal.

The processor 430 is implemented by hardware and software. The processor 430 may be implemented as one or more CPU chips, cores (for example, multi-core processors), FPGAs, ASICs, and DSPs. The processor 430 communicates with the ingress ports 410, the receiver unit 420, the transmitter unit 440, the egress ports 450, and the memory 460. The processor 430 comprises a coding module 470 (for example, an encoding module 470 or a decoding module 470). The encoding or decoding module 470 implements the embodiments disclosed in this specification, to implement the method for obtaining a candidate motion vector list provided in the embodiments of this disclosure. For example, the encoding or decoding module 470 implements, processes, or provides various coding operations. Therefore, inclusion of the encoding or decoding module 470 provides a substantial improvement to functions of the video coding device 400 and affects a switching of the video coding device 400 to a different status. Alternatively, the encoding/decoding module 470 is implemented as instructions stored in the memory 460 and executed by the processor 430.

The memory 460 comprises one or more disks, tape drives, and solid state drives and may be used as an overflow data storage device, to store programs when such programs are selectively executed, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 5:
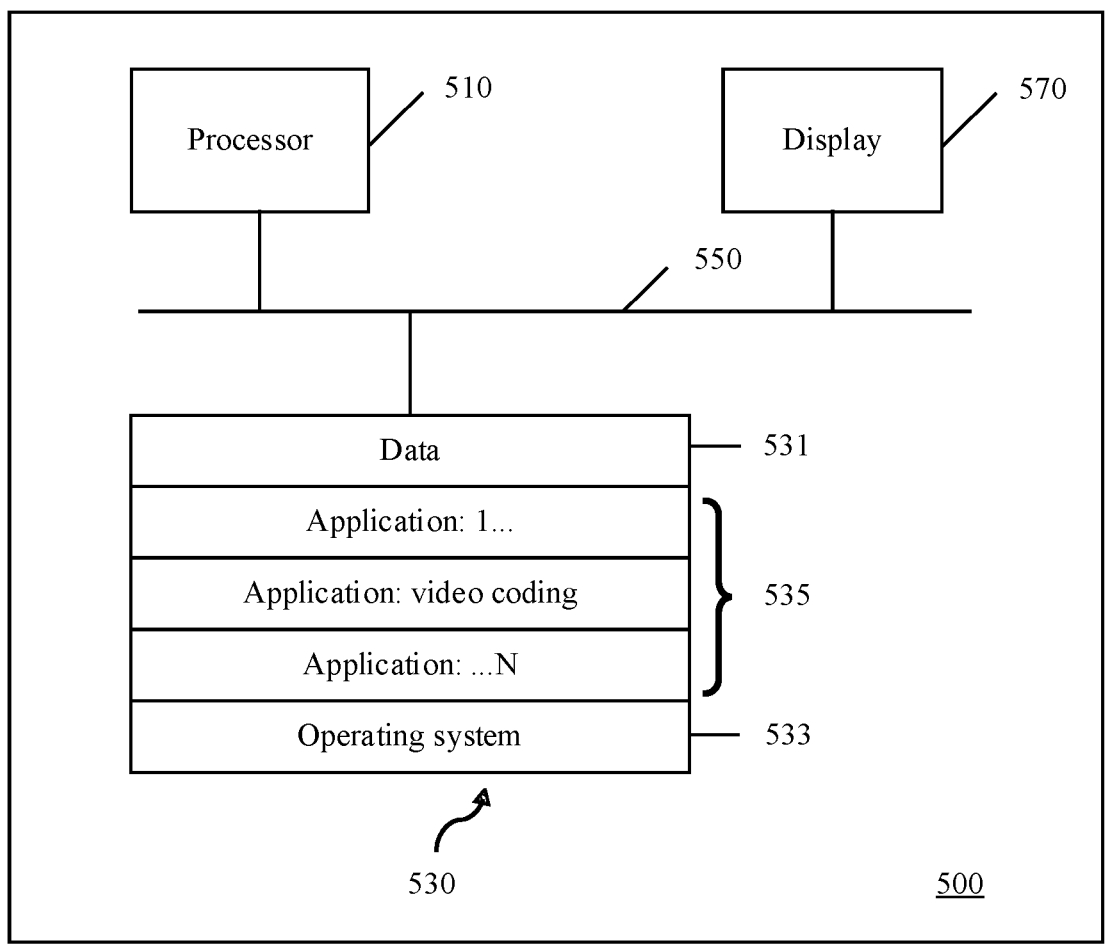
FIG. 5 is a block diagram of another example of an encoding apparatus or a decoding apparatus for implementing an embodiment of this disclosure.

FIG. 5 is simplified block diagram of an apparatus 500 that can be used as either or two of the source device 12 and the destination device 14 in FIG. 1A according to an example embodiment. The apparatus 500 can implement the technologies of this disclosure. In other words, FIG. 5 is a schematic block diagram of an implementation of an encoding device or a decoding device (a coding device 500 for short) according to an embodiment of this disclosure. The coding device 500 may comprise a processor 510, a memory 530, and a bus system 550. The processor and the memory are connected through the bus system. The memory is configured to store an instruction. The processor is configured to execute the instruction stored in the memory. The memory of the coding device stores program code, and the processor may invoke the program code stored in the memory, to perform various video encoding or decoding methods described in this disclosure. To avoid repetition, details are not described herein.

In this embodiment of this disclosure, the processor 510 may be a central processing unit (CPU), or the processor 510 may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or may be any conventional processor or the like.

The memory 530 may comprise a read-only memory (ROM) device or a random access memory (RAM) device. Any other proper type of storage device may be alternatively used as the memory 530. The memory 530 may comprise code and data 531 accessed by the processor 510 through the bus 550. The memory 530 may further comprise an operating system 533 and application programs 535. The application programs 535 comprise at least one program that allows the processor 510 to perform the video encoding or decoding method (in particular, the method for obtaining a candidate motion vector list described in this disclosure) described in this disclosure. For example, the application programs 535 may comprise applications 1 to N, and further comprises a video encoding or decoding application (briefly referred to as a video coding application) that is used to perform the video encoding or decoding method described in this disclosure.

The bus system 550 may not only comprise a data bus, but also comprise a power bus, a control bus, a status signal bus, and the like. However, for clear description, various types of buses in the figure are marked as the bus system 550.

Optionally, the coding device 500 may further comprise one or more output devices, for example, a display 570. In an example, the display 570 may be a touch-sensitive display that combines a display and a touch-sensitive element that operably senses a touch input. The display 570 may be connected to the processor 510 through the bus 550.

Figure 6:
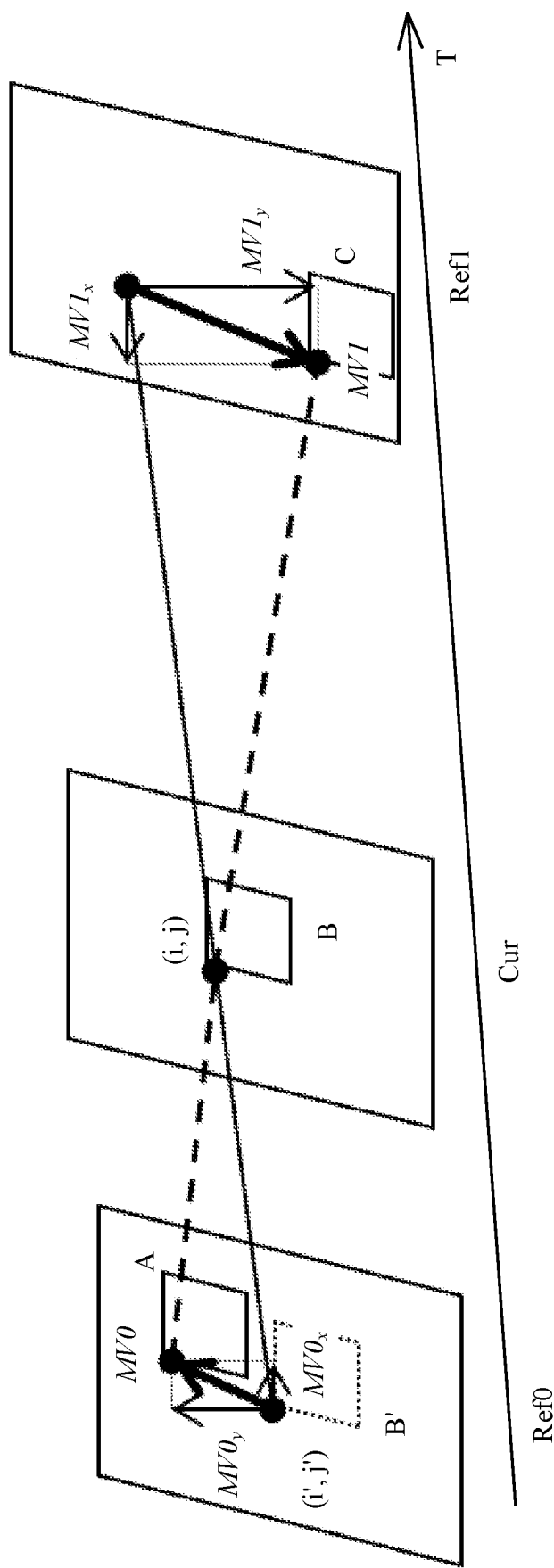
FIG. 6 is a schematic diagram in which motion information is used for inter prediction according to an embodiment of this disclosure.

One video sequence comprises a specific quantity of pictures, where the pictures are typically referred to as frames (Frame). Neighboring pictures are typically similar, that is, a large amount of redundancy is contained thereof. A purpose of using motion compensation is to increase a compression ratio by eliminating redundancy between neighboring frames. Motion compensation is a method for describing a difference between neighboring frames ("neighboring" herein indicates that two frames are neighboring in a coding relationship but does not necessarily indicate that the two frames are neighboring in a playing sequence). Motion compensation is one stage of an inter prediction process. Before motion compensation is performed, motion information of a coding block has been obtained through motion estimation or bitstream decoding. The motion information mainly comprises: (1) a prediction direction of the coding block: including forward prediction, backward prediction, and bidirectional prediction, where forward prediction indicates that the coding block is obtained through prediction based on a previous coded frame, backward prediction indicates that the coding block is obtained through prediction based on a next coded frame, and bidirectional prediction indicates that the coding block is obtained through prediction with reference to a previous coded frame and a next coded frame; (2) a reference picture index of the coding block, where the reference picture index indicates a frame in which a reference block of the current coding block is located; and (3) a motion vector MV of the coding block, where the motion vector indicates a motion displacement of the coding block relative to the reference block, and the MV comprises a horizontal component (denoted as MVx) and a vertical component (denoted as MVy), where MVx and MVy respectively indicate a horizontal motion displacement and vertical motion displacement of the coding block relative to the reference block. In the case of forward prediction or backward prediction, the coding block has only one MV; and in the case of bidirectional prediction, the coding block has two MVs. FIG. 6 shows descriptions of the foregoing motion information. In FIG. 6 and the following descriptions about the motion information and prediction information, 0 indicates forward, and 1 indicates backward. For example, Ref0 represents a forward reference picture, Ref1 represents a backward reference picture, MV0 represents a forward motion vector, and MV1 represents a backward motion vector. A, B, and C represent a forward reference block, a current coding block, and a backward reference block, respectively. Cur represents a current coding frame, and dashed lines indicate a motion track of the block B. Motion compensation is a process of finding the reference block based on the motion information, and processing the reference block to obtain a prediction block of the coding block.

A basic process of forward prediction motion compensation is as follows. As shown in FIG. 6, the current coding block is the block B in the figure, and the height and the width of B are denoted as H and W, respectively. In this case, it is known, based on the motion information, that a forward reference picture of the current coding block B is a frame Ref0, and a forward motion vector of the current coding block B is MV0=(MV0x, MV0y). When the coding block B in the Cur frame is coded, a same coordinate point is first found in the frame Ref0 based on coordinates (i, j) of a point in the above-left corner of the block B in the Cur frame, a block B' in the Ref0 may be obtained based on the height and the width of the block B, and then the block B' is moved to the block A based on the MV0 of the block B'. Finally, interpolation processing is performed on the block A to obtain a prediction block of the current coding block B. A pixel value of each pixel in the prediction block of the current coding block B is referred to as a prediction value of the corresponding pixel in the block B. A process of backward prediction motion compensation is the same as the process of forward prediction motion compensation, but reference directions are different. It should be noted that a prediction block obtained through backward prediction motion compensation and a prediction block obtained through forward prediction motion compensation are referred to as a backward prediction block and a forward prediction block, respectively. When the coding block is not bidirectionally predicted, the obtained forward prediction block and backward prediction block are prediction blocks of the current coding block.

In the case of bidirectional prediction, a forward prediction block and a backward prediction block are first obtained based on motion information respectively by executing a process of forward prediction motion compensation and by executing a process of backward prediction motion compensation, and then weighted prediction is performed on or a bi-directional prediction optical flow (BIO) technology is used for values of collocated pixels in the forward prediction block and the backward prediction block, to obtain a prediction block of the coding block B.

When the prediction value of the current coding block is calculated by using the weighted prediction method, only a weighted sum between a value of a pixel of the forward prediction block and a value of a collocated pixel of the backward prediction block is calculated according to the following formula (1):

$$\text{Pred}B(i,j) = \omega_0 \text{Pred}A(i,j) + \omega_1 \text{Pred}C(i,j) \quad (1)$$

In the formula (1), PredB(i, j), PredA(i, j), and PredC(i, j) respectively represent a prediction value of the prediction block of the current coding block, a prediction value of the forward prediction block of the current coding block, and a prediction value of the backward prediction block of the current coding block at coordinates (i, j). $\omega_0$ and $\omega_1$ ($0 \leq \omega_0 \leq 1$, $0 \leq \omega_1 \leq 1$, and $\omega_0 + \omega_1 = 1$) are weighting coefficients. The weighting coefficients may vary with different encoders. Typically, both $\omega_0$ and $\omega_1$ are ½.

Figure 7:
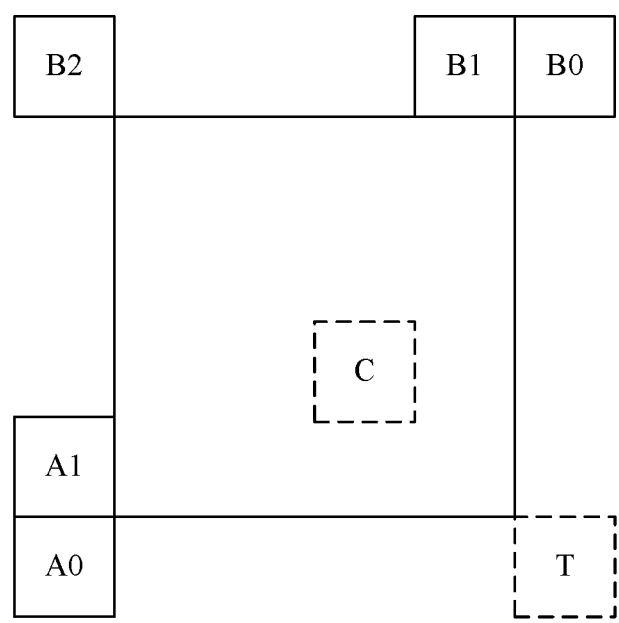
FIG. 7 is a schematic diagram of locations of candidate picture blocks of a current block.

In a process of obtaining a candidate motion vector list of an AMVP mode, a motion vector (MV) that can be added to the candidate motion vector list as a candidate comprises an MV of a spatially neighboring picture block of the current block and an MV of a temporally neighboring picture block of the current block. The MV of the spatially neighboring picture block may comprise an MV of a left candidate picture block of the current block and an MV of a above candidate picture block of the current block. For example, as shown in FIG. 7, a set of left candidate picture blocks comprises {A0, A1}, a set of above candidate picture blocks comprises {B0, B1, B2}, and a set of temporally neighboring candidate picture blocks comprises {C, T}. All the three sets can be added to the candidate motion vector list as candidates. However, according to an existing coding standard, a maximum length of the candidate motion vector list of AMVP is 2. Therefore, MVs of at most two picture blocks should be determined from the three sets based on a specified order and added to the candidate motion vector list. The order may be as follows. The set of left candidate picture blocks {A0, A1} of the current block is preferentially considered (where A0 is first considered, and A1 is then considered if A0 is unavailable); then the set of above candidate picture blocks {B0, B1, B2} of the current block is considered (where B0 is first considered, B1 is then considered if B0 is unavailable, and B2 is finally considered if B1 is unavailable); and finally, the set of temporally neighboring candidate picture blocks {C, T} of the current block is considered (where T is first considered, and C is then considered if T is unavailable). A motion vector determined from the candidate motion vector list and motion information corresponding to the determined motion vector are used to complete the motion compensation process described above, so as to obtain the prediction value of the current block.

A method for obtaining a candidate motion vector list comprises the following blocks.

Block 1: Select, from a set of spatially neighboring candidate picture blocks, an MV that can be added to a candidate motion vector list.

Block 1.1: Obtain an MV that is of at most one picture block from the set of left candidate picture blocks {A0, A1} of the current block and that can be added to the candidate motion vector list.

That a picture block is available means that the picture block is encoded and an inter prediction mode is used. If the picture block does not exist, or if the picture block is not encoded or decoded, or if the picture block does not use the inter prediction mode, the picture block is unavailable. Whether A0 is available is first determined. If A0 is available, A0 is a left candidate picture block and A1 does not need to be determined. If A0 is unavailable, whether A1 is available is determined. If A1 is available, A1 is a left candidate picture block. If A1 is unavailable, the left candidate picture block of the current picture block is unavailable.

When A0 is available, it is determined whether a reference picture of A0 is the same as a reference picture of the current block. If the reference picture of A0 is the same as the reference picture of the current block, an MV of A0 is added to the candidate motion vector list. If the reference picture of A0 is different from the reference picture of the current block, the MV of A0 is scaled according to the following formula (2):

$$MVs = \frac{CurPoc - DesPoc}{CurPoc - SpaPoc} \times MV \quad (2)$$

CurPoc represents a picture order count (picture order count, POC) of a picture in which the current block is located, DesPoc represents a POC of the reference picture of the current block, SpaPoc represents a POC of a reference picture of a spatially neighboring picture block (for example, A0), and MVs indicates a scaled MV. The MVs is added to the candidate motion vector list. In this case, A1 does not need to be considered, that is, whether A1 is available is not determined.

It should be understood that this implementation is an example of an implementation of performing scaling processing on an MV. All scaling processing subsequently used in this specification may be performed in a similar manner or in another manner of performing scaling processing on an MV based on a spatial distance in a conventional technology. This is not limited in this embodiment of this disclosure, and details are not described in the following.

When A0 is unavailable but A1 is available, it is determined whether a reference picture of A1 is the same as the reference picture of the current block. If the reference picture of A1 is the same as the reference picture of the current block, an MV of A1 is added to the candidate motion vector list. If the reference picture of A1 is different from the reference picture of the current block, the MV of A1 is scaled according to the formula (2), and an MVs is added to the candidate motion vector list.

If neither A0 nor A1 is available, the MV of A0 and the MV of A1 are excluded.

Obtaining of the reference picture of the current block is specifically described in block 801 in a subsequent embodiment. Details are not described herein.

Block 1.2: Obtain an MV that is of at most one picture block from the set of above candidate picture blocks {B0, B1, B2} of the current block and that can be added to the candidate motion vector list.

Whether B0 is available is first determined. If B0 is available, B0 is an above candidate picture block, and B1 and B2 do not need to be determined. If B0 is unavailable, whether B1 is available is determined. If B1 is available, B1 is an above candidate picture block, and B2 does not need to be determined. If B1 is unavailable, whether B2 is available is determined. If B2 is available, B2 is an above candidate picture block. If B2 is unavailable, the above candidate picture block of the current picture block is unavailable.

When B0 is available, it is determined whether a reference picture of B0 is the same as the reference picture of the current block. If the reference picture of B0 is the same as the reference picture of the current block, an MV of B0 is added to the candidate motion vector list. If the reference picture of B0 is different from the reference picture of the current block, and a left candidate picture block of the current picture block is unavailable, the MV of B0 is scaled according to the formula (2), and an MVs is added to the candidate motion vector list. If the reference picture of B0 is different from the reference picture of the current block, and a left candidate picture block of the current picture block is available, the MV of B0 is excluded. If an MV related to B0 is added to the candidate motion vector list, B1 and B2 do not need to be considered, that is, whether B1 and B2 are available is not determined.

When B0 is unavailable but B1 is available, it is determined whether a reference picture of B1 is the same as the reference picture of the current block. If the reference picture of B1 is the same as the reference picture of the current block, an MV of B1 is added to the candidate motion vector list. If the reference picture of B1 is different from the reference picture of the current block, and a left candidate picture block of the current picture block is unavailable, the MV of B1 is scaled according to the formula (2), and an MVs is added to the candidate motion vector list. If the reference picture of B1 is different from the reference picture of the current block, and a left candidate picture block of the current picture block is available, the MV of B1 is excluded. If an MV related to B1 is added to the candidate motion vector list, B2 does not need to be considered, that is, whether B2 is available is not determined.

When B0 and B1 are unavailable but B2 is available, it is determined whether a reference picture of B2 is the same as the reference picture of the current block. If the reference picture of B2 is the same as the reference picture of the current block, an MV of B2 is added to the candidate motion vector list. If the reference picture of B2 is different from the reference picture of the current block, and a left candidate picture block of the current picture block is unavailable, the MV of B2 is scaled according to the formula (2), and an MVs is added to the candidate motion vector list. If the reference picture of B2 is different from the reference picture of the current block, and a left candidate picture block of the current picture block is available, the MV of B2 is excluded.

If B0, B1, and B2 are unavailable, the MV of B0, the MV of B1, and the MV of B2 are excluded.

After block 1.2, if the candidate motion vector list already comprises two MVs, and the two MVs are different, the following block 2 and block 3 do not need to be performed. However, if the two MVs are the same, one of the two MVs shouldo be deleted, and block 2 continues to be performed. If the candidate motion vector list comprises only one MV or does not comprise any MV, block 2 also should be performed.

Block 2: If a length of the candidate motion vector list is less than 2, select an MV that is of at most one picture block from the set of temporally neighboring candidate picture blocks {C, T} and that can be added to the candidate motion vector list.

Whether T is available is first determined. If T is available, an MV of a collocated block of T is scaled, a scaled MV is added to the candidate motion vector list, and C does not need to be determined. If T is unavailable, whether C is available is determined. If C is available, an MV of a collocated block of C is scaled, and a scaled MV is added to the candidate motion vector list. If C is unavailable, the temporally neighboring picture block is unavailable.

When T is available, the MV of the collocated block of T is scaled according to the following formula (3):

$$curMV = \frac{td}{tb} colMV \qquad (3)$$

tb represents a distance between a picture in which the current block is located and the reference picture of the current block; td represents a distance between a collocated picture and a reference picture of the collocated picture, where the collocated picture typically refers to a reference picture, of all reference pictures of the current block, whose POC is closest to a POC of the picture in which the current block is located; colMV represents the MV of the collocated block of T, where the collocated block of T is a picture block, whose location is the same as the location of T, in a collocated picture of the picture in which T is located; and curMV represents a scaled MV. curMV is added to the candidate motion vector list. In this case, C does not need to be considered, that is, whether C is available is not determined.

When T is unavailable but C is available, an MV of C is scaled according to the formula (3), and curMV is added to the candidate motion vector list.

Block 3: If the length of the candidate motion vector list is less than 2, fill the candidate motion vector list by using an MV whose value is 0, to enable the length of the candidate motion vector list to be equal to 2.

Optionally, if the length of the candidate motion vector list is less than 2, the candidate motion vector list may be filled by using a history-based motion vector prediction (HMVP) method. If the length of the candidate motion vector list is still less than 2 after filling, the MV whose value is 0 is used for filling, to enable the length of the candidate motion vector list to be equal to 2.

That is, after a merge candidate list is constructed by using a temporal MVP method and a TMVP method, an HMVP merge candidate is added to the merge candidate list. A history candidate motion vector list comprises a history candidate motion vector, and the history candidate motion vector is motion information of a previously coded block. The history candidate motion vector list on an encoder/decoder side is generally constructed and used as follows.

(1) Initialize the history candidate motion vector list when slice (SLICE/tile group) starts to be decoded, and clear the history candidate motion vector list.

(2) Decode a current CU, and if the current CU or the current block uses a merge mode or an inter prediction mode, generate a merge motion information candidate list or a motion vector prediction candidate list, and add the history candidate motion vector in the history candidate motion vector list to the merge motion information candidate list or the motion vector prediction candidate list.

(3) After the current CU or the current block is decoded, add a motion vector of the current block as a new history candidate motion vector to the history candidate motion vector list, and update the history candidate motion vector list.

In the foregoing conventional technology, in the process of selecting, from the set of spatially neighboring candidate picture blocks, the MV that can be added to the candidate motion vector list in block 1, when the reference picture of the left candidate picture block is different from the reference picture of the current block, the MV of the left candidate picture block should be scaled, and then the scaled MV is added to the candidate motion vector list. This is comparatively complex. In view of this, this disclosure makes improvements.

Figure 8:
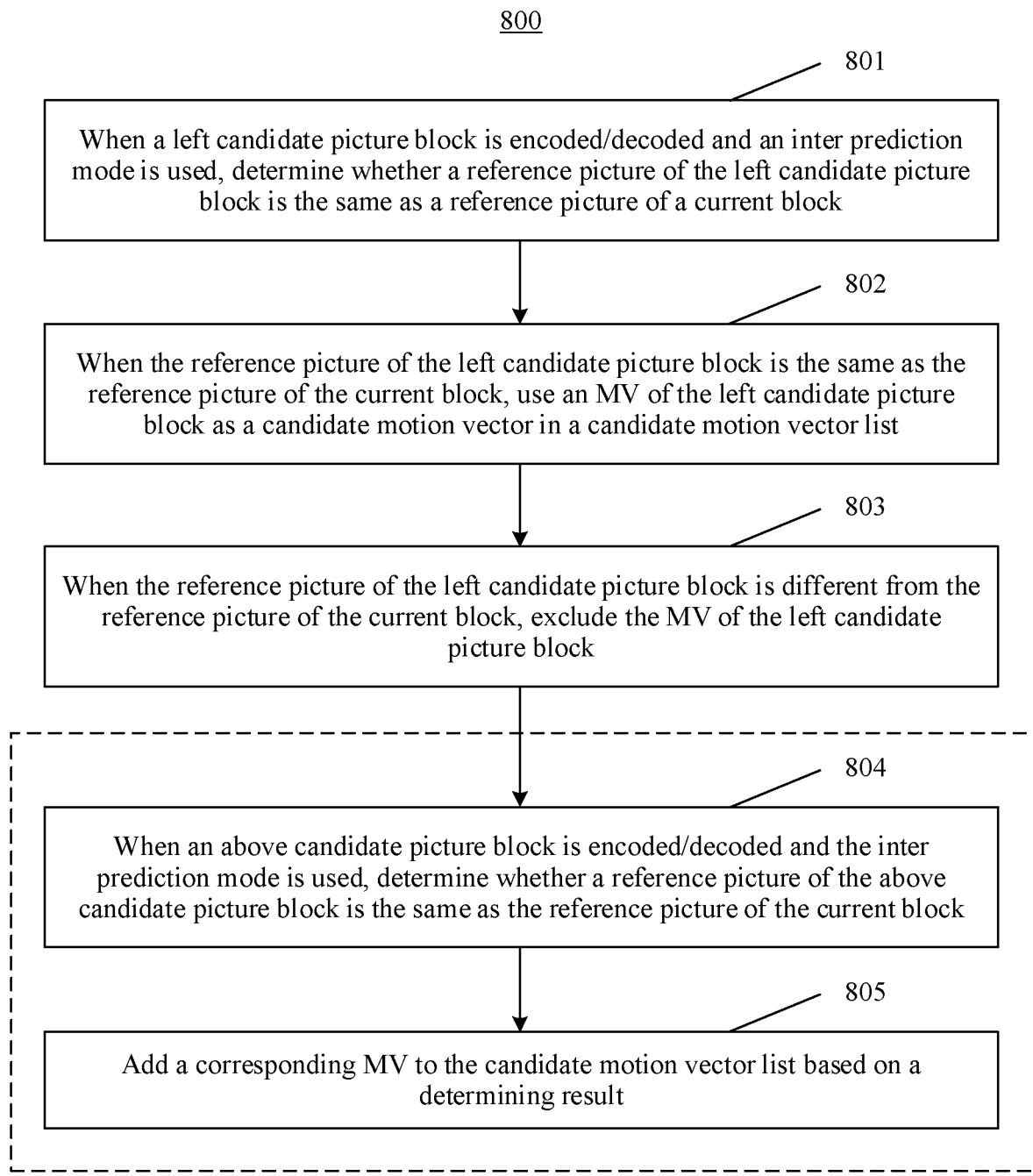
FIG. 8 is a schematic flowchart of a method for obtaining a candidate motion vector list, for implementing an embodiment of this disclosure.

FIG. 8 is a schematic flowchart of a method for obtaining a candidate motion vector list, for implementing an embodiment of this disclosure. A process 800 may be performed by the video encoder 20 or the video decoder 30. The process 800 is described as a series of blocks or operations. It should be understood that the blocks or operations of the process 800 may be performed in various sequences and/or performed simultaneously, and are not limited to an execution sequence shown in FIG. 8. As shown in FIG. 8, the method comprises the following blocks.

Block 801: When a left candidate picture block is encoded/decoded and an inter prediction mode is used, determine whether a reference picture of the left candidate picture block is the same as a reference picture of a current block.

In this disclosure, at an encoder side, it is determined whether the left candidate picture block is encoded; and at a decoder side, it is determined whether the left candidate picture block is decoded. That the left candidate picture block is encoded or decoded and the inter prediction mode is used to indicate that the left candidate picture block is available, and further it should be determined whether the reference picture of the left candidate picture block is the same as the reference picture of the current block.

On the decoder side, motion information of the current block is obtained by parsing a bitstream. When the current block uses a unidirectional (for example, a first direction) inter prediction mode, the motion information is first-direction motion information of the current block, and comprises one or more reference picture indexes (a plurality of frame indexes are obtained through parsing if the current block has a plurality of reference pictures) of the current block in the first direction. When the current block uses a bidirectional (for example, a first direction and a second direction) inter prediction mode, the motion information comprises first-direction motion information of the current block and second-direction motion information of the current block. The first-direction motion information comprises one or more reference picture indexes of the current block in the first direction, and the second-direction motion information comprises one or more reference picture indexes of the current block in the second direction. For example, a flag predFlagL0 may be used to indicate whether a corresponding picture block uses a first-direction inter prediction mode (a list0 is used to indicate the first-direction motion information), and a flag predFlagL1 may be used to indicate whether the corresponding picture block uses a second-direction inter prediction mode (a list1 is used to indicate the second-direction motion information). A value 0 of the foregoing flag specifies that a corresponding-direction inter prediction mode is not used; and a value 1 of the foregoing flag specifies that the corresponding-direction inter prediction mode is used. There is a correspondence between a reference picture index and a POC of a reference picture, and a corresponding POC can be found in a reference picture list based on the reference picture index in the list0 and/or the list1 of the current block. On the encoder side, the motion information of the current block is determined by comparing coding performance based on RDO. One or more POCs of the one or more reference pictures of the current block is/are separately compared with a POC of the reference picture of the left candidate picture block, to determine whether one of the one or more POCs of the one or more reference pictures of the current block is the same as the POC of the reference picture of the left candidate picture block, and a candidate motion vector list of the current block can be constructed based on a determining result. This is described in detail in blocks 802 and 803.

Block 802: When the reference picture of the left candidate picture block is the same as the reference picture of the current block, use an MV of the left candidate picture block as a candidate motion vector in the candidate motion vector list.

Block 803: When the reference picture of the left candidate picture block is different from the reference picture of the current block, exclude the MV of the left candidate picture block.

That the reference picture of the left candidate picture block is the same as the reference picture of the current block means that a POC of a unique reference picture of the current block or one of POCs of a plurality of reference pictures of the current block is the same as one of POCs of reference pictures of left candidate picture blocks. In one comparison method, a POC corresponding to a reference picture index in the first-direction motion information of the current block is compared with a POC corresponding to a reference picture index in first-direction motion information of a location A (A0 or A1). If the two POCs are the same, an MV of the location A is added to the candidate motion vector list, and the second-direction motion information of the current block does not need to be determined. If the two POCs are different, a POC corresponding to a reference picture index in the second-direction motion information of the current block is compared with a POC corresponding to a reference picture index in second-direction motion information of the location A. If the two POCs are the same, the MV of the location A is added to the candidate motion vector list. In another comparison method, a POC corresponding to a reference picture index in first-direction motion information of the current block is compared with a POC corresponding to a reference picture index in first-direction motion information of a location A. If the two POCs are different, the POC corresponding to the reference picture index in the first-direction motion information of the current block is compared with a POC corresponding to a reference picture index in second-direction motion information of the location A. If the two POCs are different, a POC corresponding to a reference picture index in the second-direction motion information of the current block is compared with the POC corresponding to the reference picture index in the first-direction motion information of the location A. If the two POCs are different, the POC corresponding to the reference picture index in the second-direction motion information of the current block is compared with the POC corresponding to the reference picture index in the second-direction motion information of the location A.

For example, if the current block uses a unidirectional (second direction) inter prediction mode, a POC corresponding to a reference picture index in the list1 of the current block is separately compared with POCs corresponding to reference picture indexes in a list0 and a list1 of A0. If the two POCs are the same, an MV of A0 is added to the candidate motion vector list. If the two POCs are different, the MV of A0 is excluded. A comparison order is as follows: curlist1->Alist0, and curlist1->Alist1, where curlist1 represents the reference picture index in the list1 of the current block, Alist0 represents the reference picture index in the list0 of A0, and Alist1 represents a reference picture index in a list1 of A1. If the current block uses a bidirectional inter prediction mode, a POC corresponding to a reference picture index in the list0 of the current block is separately compared with POCs corresponding to reference picture indexes in a list0 and a list1 of A0. If the two POCs are the same, an MV of A0 is added to the candidate motion vector list. If the two POCs are different, a POC corresponding to a reference picture index in the list1 of the current block is separately compared with the POCs corresponding to the reference picture indexes in the list0 and the list1 of A0. If the two POCs are the same, the MV of A0 is added to the candidate motion vector list. If the two POCs are different, the MV of A0 is excluded. A comparison order is curlist0->Alist0, curlist0->Alist1, curlist1->Alist0, and curlist1->Alist1, where curlist0 represents the reference picture index in the list0 of the current block. It should be noted that the foregoing comparison order is an example for description, and the comparison order is not specifically limited in this disclosure.

Block 802 of this disclosure is the same as the processing method, described in block 1.1 in the conventional technology, used when the reference picture of the left candidate picture block is the same as the reference picture of the current block. Details are not described herein again.

In block 803 of this disclosure, when the reference picture of the left candidate picture block is different from the reference picture of the current block, in this disclosure, the MV of the left candidate picture block does not need to be scaled, and the MV of the left candidate picture block is directly excluded. For example, if a reference picture of A0 is different from the reference picture of the current block, the MV of A0 is excluded, and the MV of A0 is not added to the candidate motion vector list. This can simplify a process of obtaining the candidate motion vector list in an AMVP mode, reduce complexity of a motion information derivation process, and improve coding efficiency.

In some feasible implementations, optionally, this embodiment of this disclosure further comprises block 804 and block 805.

Block 804: When an above candidate picture block is encoded/decoded and the inter prediction mode is used, determine whether a reference picture of the above candidate picture block is the same as the reference picture of the current block.

In this disclosure, on the encoder side, it is determined whether the above candidate picture block is encoded; and on the decoder side, it is determined whether the above candidate picture block is decoded. That the above candidate picture block is encoded/decoded and the inter prediction mode is used to indicate that the above candidate picture block is available, and further it should be determined whether the reference picture of the above candidate picture block is the same as the reference picture of the current block.

On the decoder side, motion information of the current block is obtained by parsing a bitstream. When the current block uses a unidirectional (for example, a first direction) inter prediction mode, the motion information is first-direction motion information of the current block, and comprises one or more reference picture indexes (a plurality of frame indexes are obtained through parsing if the current block has a plurality of reference pictures) of the current block in the first direction. When the current block uses a bidirectional (for example, a first direction and a second direction) inter prediction mode, the motion information comprises first-direction motion information of the current block and second-direction motion information of the current block. The first-direction motion information comprises one or more reference picture indexes of the current block in the first direction, and the second-direction motion information comprises one or more reference picture indexes of the current block in the second direction. For example, a flag predFlagL0 may be used to indicate whether a corresponding picture block uses a first-direction inter prediction mode (a list0 is used to indicate the first-direction motion information), and a flag predFlagL1 may be used to indicate whether the corresponding picture block uses a second-direction inter prediction mode (a list1 is used to indicate the second-direction motion information). A value 0 of the foregoing flag specifies that a corresponding-direction inter prediction mode is not used; and a value 1 of the foregoing flag specifies that the corresponding-direction inter prediction mode is used. There is a correspondence between a reference picture index and a POC of a reference picture in a reference picture list, and a corresponding POC can be found in a reference picture list based on the reference picture index in the list0 and/or the list1 of the current block. On the encoder side, the motion information of the current block is determined by comparing coding performance based on RDO. One or more POCs of the one or more reference pictures of the current block is/are separately compared with a POC of the reference picture of the above candidate picture block, to determine whether one of the one or more POCs of the one or more reference pictures of the current block is the same as the POC of the reference picture of the above candidate picture block.

Block 805: Add a corresponding MV to the candidate motion vector list based on the determining result.

That the reference picture of the above candidate picture block is the same as the reference picture of the current block means that a POC of a unique reference picture of the current block or one of POCs of a plurality of reference pictures of the current block is the same as one of POCs of reference pictures of above candidate picture blocks. In one comparison method, a POC corresponding to a reference picture index in the first-direction motion information of the current block is compared with a POC corresponding to a reference picture index in first-direction motion information of a location B (B0, B1, or B2). If the two POCs are the same, an MV of the location B is added to the candidate motion vector list, and the second-direction motion information of the current block does not need to be determined. If the two POCs are different, a POC corresponding to the reference picture index in the second-direction motion information of the current block is compared with a POC corresponding to a reference picture index in second-direction motion information of the location B. If the two POCs are the same, the MV of the location B is added to the candidate motion vector list. In another comparison method, a POC corresponding to a reference picture index in the first-direction motion information of the current block is compared with a POC corresponding to a reference picture index in first-direction motion information of a location B. If the two POCs are different, the POC corresponding to the reference picture index in the first-direction motion information of the current block is compared with a POC corresponding to a reference picture index in second-direction motion information of the location B. If the two POCs are different, a POC corresponding to a reference picture index in the second-direction motion information of the current block is compared with the POC corresponding to the reference picture index in the first-direction motion information of the location B. If the two POCs are different, the POC corresponding to the reference picture index in the second-direction motion information of the current block is compared with the POC corresponding to the reference picture index in the second-direction motion information of the location B.

In block 805 of this disclosure, when the reference picture of the above candidate picture block is the same as the reference picture of the current block, a processing method in a case in which the reference picture of the above candidate picture block is the same as the reference picture of the current block is the same as the processing method described in block 1.2 in the conventional technology. Details are not described herein again.

In block 805 of this disclosure, when the reference picture of the above candidate picture block is different from the reference picture of the current block, there may be two processing methods in this disclosure. One method is that the MV of the above candidate picture block does not need to be scaled, and the MV of the above candidate picture block is directly excluded. For example, if a reference picture of B0 is different from the reference picture of the current block, an MV of B0 is excluded, and the MV of B0 is not added to the candidate motion vector list. The other method is that whether the left candidate picture block of the current picture block is available does not need to be determined, and the MV of the above candidate picture block is directly scaled according to the formula (1), and a scaled MV is added to the candidate motion vector list. This can improve accuracy of MV prediction and coding efficiency.

After block 805, if the candidate motion vector list already comprises two MVs and the two MVs are different, the candidate motion vector list of the current block is determined. However, if the two MVs are the same, one of the two MVs should be deleted to eliminate redundancy. In some other feasible implementations, to simplify implementation complexity, an operation of comparing MVs may not be performed, so that two same MVs are retained.

In this disclosure, when a reference picture of a spatially neighboring candidate picture block is different from the reference picture of the current block, an MV of the candidate picture block does not need to be scaled, and the MV of the candidate picture block is directly excluded. This can simplify a process of obtaining the candidate motion vector list in the inter prediction mode, reduce complexity of a motion information derivation process, and improve coding efficiency.

After the candidate motion vector list is obtained according to the foregoing embodiment, an optimal motion vector may be determined by calculating an RD cost of each candidate motion vector in the list, that is, a candidate motion vector with a minimum RD cost is used as an MVP of the current block. The RD cost may be calculated according to the following formula:

$$J = SAD + \lambda R, \text{ where}$$

J represents an RD cost, SAD is a sum of absolute differences (sum of absolute differences, SAD), obtained through motion estimation based on a candidate motion vector, between a pixel value of a prediction block and a pixel value of the current block, R represents a bit rate, and $\lambda$ represents a Lagrange multiplier.

The encoder side transfers an index of the determined MVP in the candidate motion vector list to the decoder side. Further, the encoder side may perform motion search in an MVP-centered neighboring domain, to obtain an actual motion vector of the current block. The encoder side calculates a motion vector difference (MVD) between the MVP and the actual motion vector, and transfers the MVD to the decoder side. The decoder side parses the index, finds the corresponding MVP in the candidate motion vector list based on the index, parses the MVD, and adds the MVD and the MVP to obtain the actual motion vector of the current block.

Figure 9:
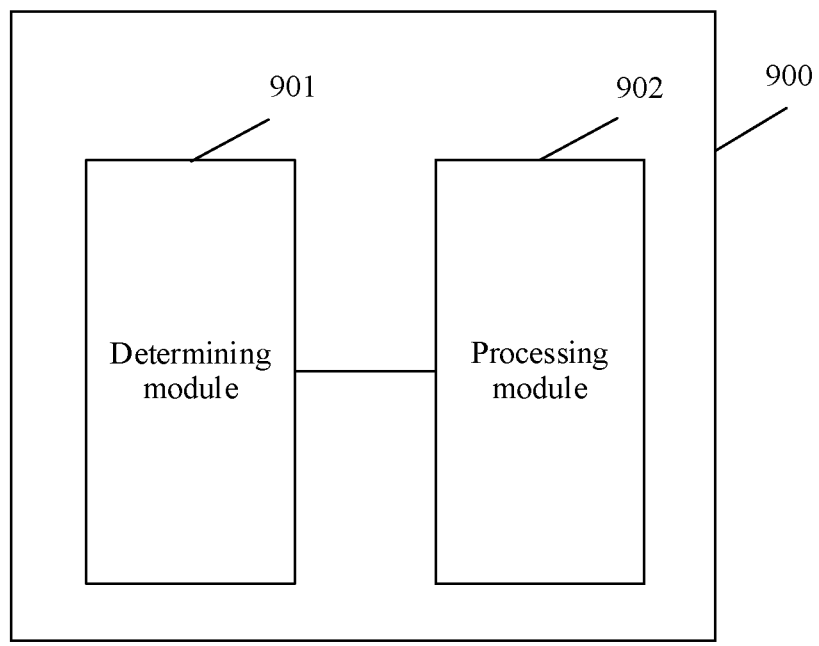
FIG. 9 is a schematic block diagram of an inter prediction apparatus 900 according to an embodiment of this disclosure.

FIG. 9 is a schematic block diagram of an inter prediction apparatus 900 according to an embodiment of this disclosure. The inter prediction apparatus 900 may comprise: a determining module 901, configured to: when a first candidate picture block is encoded/decoded and an inter prediction mode is used, determine whether a reference picture of the first candidate picture block is the same as a reference picture of a current block; and a processing module 902, configured to construct a candidate motion vector list of the current block based on a determining result, where when the reference picture of the first candidate picture block is the same as the reference picture of the current block, the candidate motion vector list comprises a motion vector MV of the first candidate picture block; or when the reference picture of the first candidate picture block is different from the reference picture of the current block, the candidate motion vector list does not comprise the MV of the first candidate picture block.

In a possible implementation, the determining module 901 is further configured to: when a second candidate picture block is encoded/decoded and the inter prediction mode is used, determine whether a reference picture of the second candidate picture block is the same as the reference picture of the current block; and the processing module 902 is further configured to: when the reference picture of the second candidate picture block is the same as the reference picture of the current block, use an MV of the second candidate picture block as a candidate motion vector in the candidate motion vector list.

In a possible implementation, when the reference picture of the second candidate picture block is different from the reference picture of the current block, the candidate motion vector list does not comprise the MV of the second candidate picture block.

In a possible implementation, the processing module 902 is further configured to: when the reference picture of the second candidate picture block is different from the reference picture of the current block, scale the MV of the second candidate picture block based on a picture order count POC of the reference picture of the second candidate picture block and based on a POC of the reference picture of the current block, and use a scaled MV as a candidate motion vector in the candidate motion vector list.

In a possible implementation, the current block has a plurality of reference pictures, and the determining module 901 is specifically configured to: separately compare POCs of the plurality of reference pictures with the POC of the reference picture of the first candidate picture block; and when one of the POCs of the plurality of reference pictures is the same as the POC of the reference picture of the first candidate picture block, determine that the reference picture of the first candidate picture block is the same as the reference picture of the current block.

In a possible implementation, the processing module 902 is further configured to determine that the MV of the first candidate picture block and the MV of the second candidate picture block are different.

In a possible implementation, when the MV of the first candidate picture block is the same as the MV of the second candidate picture block, the candidate motion vector list does not comprise the MV of the second candidate picture block.

It should be noted that the determining module 901 and the processing module 902 may be used in an inter prediction process on an encoder side or a decoder side. Specifically, on the encoder side, the modules may be used in the inter prediction unit 244 in the prediction processing unit 260 of the encoder 20; and on the decoder side, the modules may be used in the inter prediction unit 344 in the prediction processing unit 360 of the decoder 30.

It should be further noted that for specific implementation processes of the determining module 901 and the processing module 902, refer to detailed descriptions in the embodiment in FIG. 7. For brevity of the specification, details are not described herein again.

A person skilled in the art can understand that, the functions described with reference to various illustrative logical blocks, modules, and algorithm blocks disclosed and described in this specification can be implemented by hardware, software, firmware, or any combination thereof. If implemented by software, the functions described with reference to the illustrative logical blocks, modules, and blocks may be stored in or transmitted over a computer-readable medium as one or more instructions or code and executed by a hardware-based processing unit. The computer-readable medium may comprise a computer-readable storage medium, which corresponds to a tangible medium such as a data storage medium, or a communications medium including any medium that facilitates transfer of a computer program from one place to another (for example, according to a communication protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this disclosure. A computer program product may comprise a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable media.

An instruction may be executed by one or more processors such as one or more digital signal processors (DSP), general-purpose microprocessors, application-specific integrated circuits (ASIC), field programmable logic arrays (FPGA), or other equivalent integrated circuit or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and blocks described in this specification may be provided within dedicated hardware and/or software modules configured for encoding and decoding, or may be incorporated into a combined codec. In addition, the technologies may be completely implemented in one or more circuits or logic elements.

The technologies in this disclosure may be implemented in various apparatuses or devices, including a wireless handset, an integrated circuit (IC), or a set of ICs (for example, a chip set). Various components, modules, or units are described in this disclosure to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in the embodiments have respective focuses. For a part that is not described in detail in an embodiment, refer to related descriptions in other embodiments.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for obtaining a candidate motion vector list, the method comprising:
    when a first candidate picture block is encoded or decoded and an inter prediction mode is used for the first candidate picture block, determining whether a reference picture of the first candidate picture block is the same as a reference picture of a current block; and
    constructing a candidate motion vector list for the current block based on a result of the determining, wherein:
        when the reference picture of the first candidate picture block is the same as the reference picture of the current block, the candidate motion vector list comprises a motion vector (MV) of the first candidate picture block; and
        when the reference picture of the first candidate picture block is different from the reference picture of the current block, the MV of the first candidate picture block is not used to construct the candidate motion vector list.

2. The method of claim 1, further comprising:
    when a second candidate picture block is encoded or decoded and the inter prediction mode is used for the second candidate picture block, determining whether a reference picture of the second candidate picture block is the same as the reference picture of the current block; and when the reference picture of the second candidate picture block is the same as the reference picture of the current block, using an MV of the second candidate picture block as a candidate motion vector in the candidate motion vector list.

3. The method of claim 2, wherein when the reference picture of the second candidate picture block is different from the reference picture of the current block, an MV of the second candidate picture block is not used to construct the candidate motion vector list.

4. The method of claim 2, further comprising:
when the reference picture of the second candidate picture block is different from the reference picture of the current block, scaling the MV of the second candidate picture block based on a picture order count (POC) of the reference picture of the second candidate picture block and based on a POC of the reference picture of the current block; and
using a scaled MV as a candidate motion vector in the candidate motion vector list.

5. The method of claim 1, wherein:
the current block has a plurality of reference pictures; and
determining whether a reference picture of the first candidate picture block is the same as a reference picture of a current block comprises:
separately comparing POCs of the plurality of reference pictures with the POC of the reference picture of the first candidate picture block; and
when one of the POCs of the plurality of reference pictures is the same as the POC of the reference picture of the first candidate picture block, determining that the reference picture of the first candidate picture block is the same as the reference picture of the current block.

6. The method of claim 2, wherein before using an MV of the second candidate picture block as a candidate motion vector in the candidate motion vector list, the method further comprises:
determining that the MV of the first candidate picture block and the MV of the second candidate picture block are different.

7. The method of claim 2, wherein when the MV of the first candidate picture block is the same as the MV of the second candidate picture block, the MV of the second candidate picture block is not used to construct the candidate motion vector list.

8. An inter prediction apparatus, comprising:
a determining module, configured to: when a first candidate picture block is encoded or decoded, and an inter prediction mode is used for the first candidate picture block, determine whether a reference picture of the first candidate picture block is the same as a reference picture of a current block; and
a processing module, configured to construct a candidate motion vector list for the current block based on a result of the determining, wherein:
when the reference picture of the first candidate picture block is the same as the reference picture of the current block, the candidate motion vector list comprises an MV of the first candidate picture block; and
when the reference picture of the first candidate picture block is different from the reference picture of the current block, the MV of the first candidate picture block is not used to construct the candidate motion vector list.

9. The apparatus of claim 8, wherein:
the determining module is further configured to: when a second candidate picture block is encoded or decoded and the inter prediction mode is used for the second candidate picture block, determine whether a reference picture of the second candidate picture block is the same as the reference picture of the current block; and
the processing module is further configured to: when the reference picture of the second candidate picture block is the same as the reference picture of the current block, use an MV of the second candidate picture block as a candidate motion vector in the candidate motion vector list.

10. The apparatus of claim 9, wherein when the reference picture of the second candidate picture block is different from the reference picture of the current block, an MV of the second candidate picture block is not used to construct the candidate motion vector list.

11. The apparatus of claim 9, wherein the processing module is further configured to:
when the reference picture of the second candidate picture block is different from the reference picture of the current block, scale the MV of the second candidate picture block based on a picture order count POC of the reference picture of the second candidate picture block, and based on a POC of the reference picture of the current block; and
use a scaled MV as a candidate motion vector in the candidate motion vector list.

12. The apparatus of claim 8, wherein:
the current block has a plurality of reference pictures; and
the determining module is further configured to:
separately compare POCs of the plurality of reference pictures with the POC of the reference picture of the first candidate picture block; and
when one of the POCs of the plurality of reference pictures is the same as the POC of the reference picture of the first candidate picture block, determine that the reference picture of the first candidate picture block is the same as the reference picture of the current block.

13. The apparatus of claim 9, wherein the processing module is further configured to determine that the MV of the first candidate picture block and the MV of the second candidate picture block are different.

14. The apparatus of claim 9, wherein when the MV of the first candidate picture block is the same as the MV of the second candidate picture block, the MV of the second candidate picture block is not used to construct the candidate motion vector list.

15. A non-transitory computer readable medium comprising instructions which, when executed by a computer, cause the computer to perform operations comprising:
when a first candidate picture block is encoded or decoded and an inter prediction mode is used for the first candidate picture block, determining whether a reference picture of the first candidate picture block is the same as a reference picture of a current block; and
constructing a candidate motion vector list for the current block based on a result of the determining, wherein:
when the reference picture of the first candidate picture block is the same as the reference picture of the current block, the candidate motion vector list comprises a motion vector (MV) of the first candidate picture block; and when the reference picture of the first candidate picture block is different from the reference picture of the current block, the MV of the first candidate picture block is not used to construct the candidate motion vector list.

16. The non-transitory computer readable medium of claim 15, wherein the operations further comprise:

when a second candidate picture block is encoded or decoded and the inter prediction mode is used for the second candidate picture block, determining whether a reference picture of the second candidate picture block is the same as the reference picture of the current block; and when the reference picture of the second candidate picture block is the same as the reference picture of the current block, using an MV of the second candidate picture block as a candidate motion vector in the candidate motion vector list.

17. The non-transitory computer readable medium of claim 16, wherein when the reference picture of the second candidate picture block is different from the reference picture of the current block, an MV of the second candidate picture block is not used to construct the candidate motion vector list.

18. The non-transitory computer readable medium of claim 16, wherein the operations further comprise:

when the reference picture of the second candidate picture block is different from the reference picture of the current block, scaling the MV of the second candidate picture block based on a picture order count (POC) of the reference picture of the second candidate picture block and based on a POC of the reference picture of the current block; and using a scaled MV as a candidate motion vector in the candidate motion vector list.

19. The non-transitory computer readable medium of claim 15, wherein:

the current block has a plurality of reference pictures; and determining whether a reference picture of the first candidate picture block is the same as a reference picture of a current block comprises:

separately comparing POCs of the plurality of reference pictures with the POC of the reference picture of the first candidate picture block; and when one of the POCs of the plurality of reference pictures is the same as the POC of the reference picture of the first candidate picture block, determining that the reference picture of the first candidate picture block is the same as the reference picture of the current block.

20. The non-transitory computer readable medium of claim 16, wherein before using an MV of the second candidate picture block as a candidate motion vector in the candidate motion vector list, the operations further comprise:

determining that the MV of the first candidate picture block and the MV of the second candidate picture block are different.

* * * * *